United States Patent [19]

Lauw et al.

[11] Patent Number: 4,994,684

[45] Date of Patent: Feb. 19, 1991

[54] DOUBLY FED GENERATOR VARIABLE SPEED GENERATION CONTROL SYSTEM

[75] Inventors: Hian K. Lauw; Gerald C. Alexander, both of Corvallis, Oreg.

[73] Assignee: The State of Oregon acting by and through the State Board of Higher Education on behalf of Oregon State University, Eugene, Oreg.

[21] Appl. No.: 304,044

[22] Filed: Jan. 30, 1989

[51] Int. Cl.⁵ ............................................. F01D 15/10
[52] U.S. Cl. ........................................ 290/52; 290/44; 290/55; 290/40 C; 322/15; 318/800
[58] Field of Search ........................ 290/43, 44, 54, 55, 290/40 C, 52; 322/14–17, 29, 32, 4; 318/800, 807, 821

[56] References Cited

U.S. PATENT DOCUMENTS

| | | | |
|---|---|---|---|
| 3,975,646 | 8/1976 | Kilgore et al. | 307/21 |
| 4,001,666 | 1/1977 | Grenfell | 318/161 |
| 4,039,909 | 8/1977 | Baker | 318/187 |
| 4,096,557 | 6/1978 | Schwarz | 363/9 |
| 4,132,931 | 1/1979 | Okuyama et al. | 318/732 |
| 4,227,136 | 10/1980 | Roesel, Jr. | 318/701 |
| 4,277,735 | 7/1981 | Okuyama et al. | 318/766 |
| 4,672,298 | 6/1987 | Rohatyn | 323/208 |
| 4,694,189 | 9/1987 | Haraguchi et al. | 290/52 |
| 4,701,691 | 10/1987 | Nickoladze | 322/32 |
| 4,710,692 | 12/1987 | Libert et al. | 318/729 |
| 4,723,104 | 2/1988 | Rohatyn | 318/813 |
| 4,757,240 | 7/1988 | Mizobuchi et al. | 318/800 |
| 4,791,309 | 12/1988 | Payne et al. | 290/52 |
| 4,806,781 | 2/1989 | Hochstetter | 290/52 |
| 4,816,696 | 3/1989 | Sakayori et al. | 290/52 |

OTHER PUBLICATIONS

H. K. Lauw, "Variable-Speed Generation with the Series-Resonant Converter," Final Report, USDOE Bonneville Power Adminstration Contract No. 79-85BP2432 Mod-1, Jan. 1987.

Lauw, H. K.; "Characteristics of the Doubly-Fed Machine in a Hydro Variable-Speed Generation System"; BPA Contract No. 79-85BP24332, Jun. 1986.

Power Technologies, Inc.; "Variable Rotor Speed for Wind Turbines: Objectives and Issues"; EPRI AP-4261, Sep. 1985.

Primary Examiner—M. H. Paschall
Attorney, Agent, or Firm—Klarquist, Sparkman, Campbell, Leigh & Whinston

[57] ABSTRACT

Disclosed is a device and method to control the conversion of an arbitrary resource energy into mechanical energy and subsequently into electric energy with a variable-speed generation system utilizing a turbine and a doubly-fed generator, to be connected directly to a power grid of a certain grid frequency. Via electronic control of the rotor speed by controlling the rotor winding excitation frequency, the device has the capability of providing an optimum tradeoff in maximum turbine efficiency and minimal generator losses to secure maximum efficiency of the total conversion process, irrespective of varying resource and electric load conditions. The excitation requirements of the generator are confined to moderate levels and yet a wide rotor-speed variation margin, starting from zero speed, is permitted. An integrated strategy is implemented which effectively coordinates the execution of these tasks and the independent control of the generator terminal voltage as well as the active and reactive electric power output. All signal processing as required correspondingly is carried out without the need for cumbersome measurements of turbine input and output power or generator losses.

30 Claims, 9 Drawing Sheets

DOUBLY FED GENERATOR VARIABLE SPEED GENERATION CONTROL SYSTEM

BACKGROUND OF THE INVENTION

This invention relates to an energy conversion system for generating electricity and to methods of controlling such systems, and more particularly, to a variable speed generation (VSG) system and control method utilizing a doubly fed generator.

A VSG system converts available energy from a resource, such as steam, hydro or wind, into variable speed rotational mechanical energy with a turbine. The mechanical energy is converted into electrical energy by a doubly fed generator. The electrical energy is supplied to a load, such as an electric power grid operating at a system frequency. A doubly fed generator is an electrical machine having a rotor with polyphase excitation rotor windings and a stator with polyphase power stator windings. This is in contrast with the synchronous generator, also having a stator with polyphase power windings, but with a rotor having direct current (DC) excitation, as used in conventional generating stations.

As worldwide supplies of our fossil energy resources, such as oil and coal, begin to dwindle or become more expensive to recover, alternative energy resources, for example, wind, solar and hydro, have been turned to for supplying the increasing demand for electric power. However, these alternative energy sources are often erratic in supplying the energy required by the turbine to produce the rotational mechanical energy. Thus far, to the best of the inventors' knowledge, commercially available generation systems have been unable to attain maximum efficiency of the overall energy conversion process under such varying resource conditions, especially because synchronous generator operation is restricted to a specific synchronous speed.

A doubly fed generator requires an energy converter to supply the polyphase excitation power to the rotor windings. Previously available converters have been costly and inefficient, making commercial implementation of a VSG system having a doubly fed generator impractical. For example, the energy converters of previous systems produce excessive detrimental harmonics. To alleviate this, bulky and expensive harmonic filters are required.

Other variable speed generation systems have proposed using an induction or a synchronous generator with an energy converter connected between the generator stator terminals and power grid to supply the power at the system frequency. However, the converter of these configurations had to be large enough to handle the full power and current supplied by the generator or additional transformers were required. The costs of these additional components also detracts from the viability of these known variable speed generation systems as compared to fixed speed generation systems. Thus, the efficient use of the alternative energy resources has been considered to be too costly as compared to the steady energy resources, such as coal and oil.

Other VSG control systems using a doubly fed generator have concentrated on maximizing turbine efficiency and ignored maximizing the efficiency of the total VSG system. For example, if rotor speed were controlled to gain turbine efficiency in relation to the varying conditions of the resource, the doubly fed generator losses may increase. A synchronous generator would be incompatible in such a system, since it is restricted to operation at a synchronous speed. Also, rotor speed control systems ignore changing electrical load conditions of the grid which may detract from the overall efficiency of the VSG system.

Moreover, other contemplated VSG systems using a doubly fed generator have not been able to supply a wide margin of rotor speed variation without causing excessive excitation requirements. To implement these systems, large converters with a high rating were proposed, and resulted in increasing the electrical losses of the VSG system. Alternatively, the margin of rotor speed variation was limited to the point where the VSG system no longer adequately used the mechanical energy supplied by the alternate resource.

Other systems may have ignored attempting to maximize the efficiency of the VSG system because instability problems could arise under certain conditions. Such instability could occur when a system controller changing the rotor speed to maximize the system efficiency fails to supply sufficient excitation current to the generator. Previous systems have contemplated reacting to these instabilities by activating a command to drop the system off the line, that is, to disconnect the generator from the power grid.

Thus, the previously contemplated variable speed generation systems were not economically nor functionally competitive with other fixed speed generation systems.

Due to the expensive nature of the previously contemplated VSG doubly fed generator systems, and the lack of a viable control strategy, the inherent benefits and qualities of the doubly fed generator were not exploited. For example, a doubly fed generator is capable of a net reactive power control over the entire speed range of the generator. Reactive power relates to the leading or lagging of the waveforms of the polyphase AC (alternating current) voltage and current with respect to one another.

The conventional synchronous generator is limited to supplying electrical energy or power to the grid while rotating at a specific synchronous speed. During start-up, the turbine-generator system must be gradually brought up from essentially zero speed to the synchronous speed before the synchronous generator is synchronized or brought on line by closing power brakers which connect the generator to the grid. Synchronization of the conventional synchronous generator with the grid is a critical task requiring human supervision. At synchronous speed, if the generator is engaged out of phase with the grid, the turbine and generator may sustain damage. If synchronization fails without damage to the turbine-generator unit, then, for example in a hydro turbine application, resynchronization requires reclosure of the gates to begin a new synchronization attempt. Attempts to automate the synchronization, to the best of the inventor's knowledge, have thus far been unsatisfactory.

Thus, due to the economic drawbacks of the previously proposed VSG systems using doubly fed generators, one particular advantage of a doubly fed generator system has not been realized. The doubly fed generator is capable of being synchronized to the power grid at essentially zero speed. Thus, if the doubly fed generator were synchronized out of phase, the turbine and generator at essentially zero speed would not suffer the mechanical shock and resulting damage that would be encountered during a full speed out of phase synchronization. Moreover, since such synchronization can occur, in the hydro turbine example, without opening the turbine gates, resynchronization after a failed attempt is not a burdensome time consuming process.

Zero speed synchronization of the doubly fed generator could be accomplished in remote locations by automated means well in advance of supplying the resource mechanical power to the turbine. As explained above, zero speed synchronization of a synchronous generator is not possible, since the synchronous generator is limited to operation at synchronous speed.

Thus, a need exists for a VSG system and method of control that is economically viable in terms of equipment costs and maximum utilization of the alternative energy resources, while delivering electrical power at a maximum efficiency and exploiting the attractive features of the doubly fed generator.

SUMMARY OF THE INVENTION

It is an overall object of the present invention to provide an improved variable speed generation system utilizing a doubly fed generator and to provide an associated control method which maximizes the efficiency of operation of the system irrespective of varying resource conditions.

A further object of the present invention is to provide a VSG system and to provide an associated method of control which facilitate reliable operation and effective coordination of the power conditioning task of the doubly fed machine.

Still a further object of the present invention is to provide a variable speed generation system and an associated control method which maximizes the efficiency of operation of the system under varying electrical load conditions of an electrical power grid to which the VSG system supplies power.

Another object of the present invention is to provide an energy conversion generating system which efficiently converts the energy available from alternative resources, such as hydro, wind and solar, as well as conventional fossil energy resources, such as oil and coal, into electrical energy irrespective of varying energy available from the energy resource.

A further object of the present invention is to provide a variable speed generation system and an associated control method responsive to varying resource and electrical load conditions.

An additional object of the present invention is to provide a variable speed generation system having a doubly fed generator and to provide an associated control method which maximizes turbine efficiency by rotor speed control while minimizing electrical losses of the doubly fed generator.

Another object of the present invention is to provide a variable speed generation system and an associated control method which maximizes the efficiency of operation of the total VSG system by optimizing the trade off between maximum turbine efficiency and minimal doubly fed generator losses.

Still a further object of the present invention is to provide a variable speed generation system having a doubly fed generator and to provide an associated control method which allows for a rotor speed variation margin from zero speed up to fifteen percent beyond the synchronous speed of a comparable fixed speed generation system, while also constraining excitation requirements to below twenty percent of the maximum output power of the VSG system.

An additional object of the present invention is to provide a control system and a control method for an energy conversion system having a doubly fed generator, the system and method having an integrated strategy for securing and effectively coordinating maximum efficiency operation of the system, and for controlling the doubly fed generator's terminal voltage and reactive power output to values within design limits of the generation system.

Yet another object of the present invention is to provide a variable speed generation system and to provide an associated control method which maximizes the efficiency of operation of the system with a minimal number of sensed system operational parameter inputs.

It is a further object of the present invention to provide a variable speed generation system having a doubly fed generator and to provide an associated control method capable of essentially zero speed synchronization of the generator with an electrical power grid being supplied by the generator.

Still another object of the present invention is to provide a variable speed generation system and an associated control method capable of automated synchronization at remote locations.

A further object of the present invention is to provide a VSG system and an associated control method which minimizes the undesirable harmonics produced by the system.

Another object of the present invention is to provide a VSG system and an associated control method which makes the use of alternative energy resources, such as hydro, wind and solar, an economically viable alternative to the fossil energy resources for electrical power generation.

An additional object of the present invention is to limit the excitation requirements of a variable speed generation system without severely restricting the rotor speed variation margin.

A further object of the present invention is to provide a variable speed generation control scheme which secures stable operation of a VSG system.

Still a further object of the present invention is to provide a variable speed generation control scheme which reliably attains maximum efficiency operation of a VSG system.

In the broadest sense, the invention comprises an energy conversion generation system for receiving resource energy from a resource and converting the resource energy into an electrical power output for supply to a polyphase electric power grid operating at a system frequency. The energy conversion system comprises a variable speed generation system including turbine means for converting a resource energy input from the resource into mechanical energy at a rotor speed. The system also includes energy converter means for producing excitation power, and a doubly fed generator coupled to the turbine means. The doubly fed generator has a rotor with excitation rotor windings and with means for applying the excitation power from the energy converter means to the rotor windings. The rotor is driven by the mechanical energy from the turbine means. The doubly fed generator also includes a stator with stator windings to supply the electrical power output to the power grid. The generation system also includes control means for varying the rotor speed in response to the power output and the resource energy input to increase the ratio of the electrical output power to the resource energy input received from the resource.

According to a more specific aspect of the present invention, the energy conversion generation system includes control means which have means for controlling the resource energy input from the resource.

In another broad sense of the invention, the energy conversion generation system includes a variable speed generation system having turbine means, energy converter means, and a doubly fed generator as described above, also includes input sensor means for sensing at least one parameter of the resource energy received by the turbine means. The input sensor means is also provided for producing a turbine input sensor signal corresponding to the sensed resource energy parameter. This generation system further includes a generator output sensor means for sensing the output power from the doubly fed generator which is supplied to the power grid, and for producing a generator output sensor signal. The generation system also includes converter signal processing means for receiving and processing the generator output sensor signal and the turbine input sensor signal. The converter signal processing means comprises means for producing a converter control signal in response to the generator output sensor signal and the turbine input sensor signal. The energy converter means includes means for controlling the excitation power produced by the converter means in response to the converter control signal to vary the rotor speed to reduce power losses in the generator.

In accordance with the present invention, the energy conversion system includes a variable speed generation system, turbine input sensor means, generator output sensor means and a variable speed generation controller. The variable speed generation system includes turbine means having an input resource energy adjustment or turbine setting means responsive to a turbine control signal for adjusting the energy delivered from the turbine means to the doubly fed generator. Examples of turbine setting means include means for opening and closing gates in a hydro system for controlling the flow of water to the turbine, means for adjusting the pitch of turbine blades, means for adjusting solar panels to adjust the angle of incidence of solar rays on the panels, and any other device for adjusting the energy delivered from a resource to the turbine means. The turbine means also converts a resource energy input from the resource into rotational mechanical energy in response to the turbine control signal.

The variable speed generation system further includes energy converter means comprising means for controlling the excitation power in response to the converter control signal. The variable speed generation system also includes a doubly fed generator coupled to the turbine means and having a rotor with rotor excitation windings and with means for applying the excitation power from the energy converter means to the rotor windings. The doubly fed generator rotor is driven by the rotational mechanical energy from the turbine means at a rotor speed. The doubly fed generator also has a stator with stator windings to supply the electrical power output to the power grid.

The turbine input sensor means are provided for sensing the resource energy input received by the turbine means and for producing a turbine input sensor signal. Generator output sensor means are also included for sensing output levels of the doubly fed generator supplied to the power grid and for producing a generator output sensor signal.

The variable speed generation controller comprises means for controlling the excitation power and the resource input energy delivered to the turbine means to control the efficiency of the system. The variable speed generation controller includes turbine signal processing means for receiving and processing the generator output sensor signal, and for producing the turbine control signal. The variable speed generation controller also includes converter signal processing means for receiving and processing the generator output sensor signal, the turbine input sensor signal, the turbine control signal and a generator reference demand signal. The variable speed generation controller produces the converter control signal in response to the received signals. In a more specific aspect of the present invention, the generation system also includes means for producing a power demand signal which is also received and processed by the turbine signal processing means, and means for producing a generator voltage reference demand signal which is received and processed by the converter signal processing means. The turbine means and the energy converter means are controlled by the variable speed generation controller which controls the efficiency of the variable speed generation system, irrespective of variations in the resource energy, by controlling the excitation power and the resource input energy delivered to the turbine means.

In accordance with another aspect of the present invention, a VSG controller as described above is provided for use with a VSG system and sensor means as also described above.

According to more specific aspects of the present invention, the converter signal processing means includes voltage controller means for producing a maximum excitation amplitude signal, and rotor speed controller means for producing an excitation frequency signal. For an energy converter means operable in a controllable current source mode, the maximum excitation amplitude and the excitation frequency signals represent the excitation current amplitude and frequency applied to the rotor windings. Furthermore, the generator output sensor means includes generator terminal voltage sensor means and a generator output power sensor means for sensing these generator output parameters and for producing respective terminal voltage and power output sensor signals. Additionally, the excitation power source for the energy converter means may be a tapped portion of the generator output power, thereby establishing a tapped excitation scheme.

In a specific illustrated embodiment, an energy conversion generation system is provided for a hydro resource, having a pressure head and a flow rate through the turbine means. The turbine input sensor means comprises means for sensing at lest one parameter of the resource related to the energy available from the resource at any given time. For example, the turbine input sensor means may include pressure head sensor means for sensing the hydro pressure head and for producing a first turbine input signal comprising a head signal. The turbine input sensor means may also include change in flow rate sensor means for sensing a change in the flow rate through the turbine means, with respect to a previous flow rate. The change in flow rate sensor means is also provided for producing a second turbine input signal comprising a change in flow rate signal.

According to another aspect of the present invention, a method is provided for converting resource energy into electrical power for supply to a power grid, using a doubly fed generator coupled to and driven by a turbine. The steps of the method comprise monitoring and sensing the resource energy received by the turbine and the generator output power, and producing respective turbine input and generator output power sensor signals. In setting steps, power demand and generator reference demand signals are set. In turbine controller and converter controller signal processing steps, the sensed, set and monitored signals comprising the turbine input, generator output signals and demand signals are processed and combined to produce respective turbine and converter control signals. The variable speed generation system accomplishes the steps of receiving the resource energy with the turbine which is used in driving the doubly fed generator at a rotor speed. In an adjusting step, the resource energy received by the turbine is adjusted to control the rotor speed. In a converting step, power is received from an excitation power source and converted into excitation power in response to the converter control signal. This excitation power is applied to the rotor windings to excite the doubly fed generator in an exciting step. With this method, generator output power is produced at the system frequency of the power grid.

Thus, the VSG system maximizes the turbine efficiency irrespective of varying resource conditions by controlling the rotor speed. The doubly fed generator advantageously controls the rotor speed by controlling the frequency of the rotor winding excitation currents with a power electronic converter. Since the converter only handles the excitation requirements of the doubly fed generator, which may be held by the VSG system to below twenty percent of generator rating, the converter may also be designed for this lower fractional rating. Thus, the initial equipment costs, as well as the operational costs of the VSG system of the present invention, are lower than the costs of other previously proposed or implemented VSG systems.

These and other objects, features and advantages of the present invention will become apparent to those skilled in the art from the following description and drawings.

DETAILED DESCRIPTION OF THE PREFERRED EMBODIMENT

Figure 1:
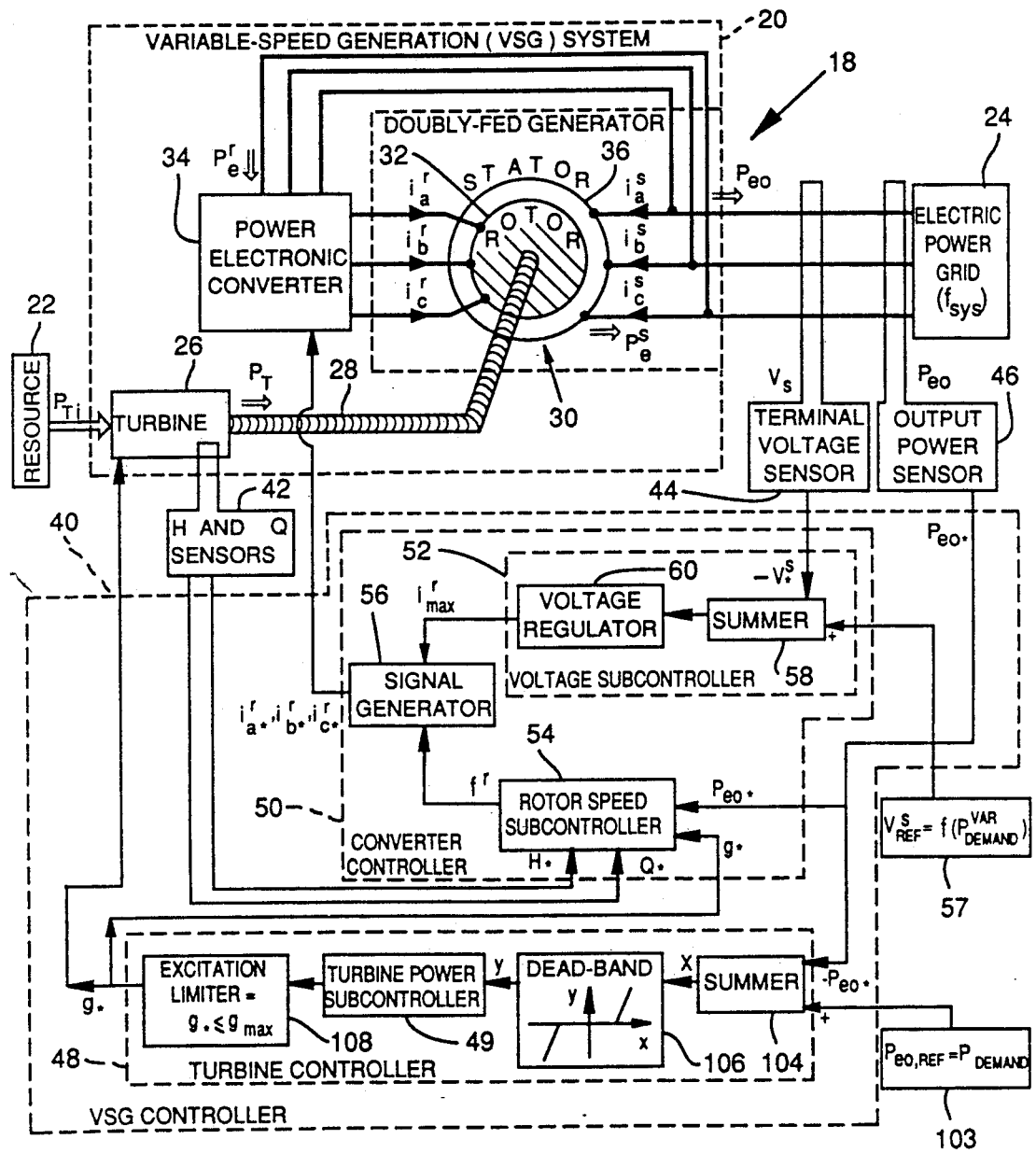
FIG. 1 is a block schematic diagram of one form of a variable speed generation system and variable speed controller of the present invention with system sensors, the system receiving mechanical power from a resource and delivering electrical power to an electrical power grid, the diagram also illustrating one form of a tapped VSG excitation system.

In this description of an illustrated embodiment of the present invention, the characters i, v, I, V, P, $P^{VAR}$, f, $\omega$, g, H, Q, and $\Delta Q$ are defined as: i=instantaneous current, v=instantaneous voltage, I=root mean square (rms) current, V=rms voltage, P=active power, $P^{VAR}$=reactive power, $f_{sys}$=frequency, $\omega$=angular frequency of speed of the rotor, g=gate position, H=head, Q=flow rate, and $\Delta Q$=change of flow rate with respect to a flow rate at a certain point in time. A bar placed above "I" or "V" indicates phasor notation, with the positive convention of these variables indicated in the drawings with arrows. The quantities which are measured by sensors for the signal processing inputs of the control system, as well as the control system outputs, have a subscript asterisk. Subscript "T" denotes turbine and "e" denotes electrical. Subscript "o" denotes an output of the generation system and "i" an input, while subscripts "a", "b" and "c" designate the AC phases of a three phase polyphase system. Superscript "s" and "r" denote stator and rotor quantities, respectively. Other variables incidental to the description will be defined in context.

Referring to FIG. 1, an illustrated embodiment of an energy conversion generation system 18 having a variable speed generation (VSG) system 20 is shown receiving resource energy from a resource 22. The energy conversion system 18 converts the resource energy into electrical power for delivery to an electrical power grid 24, operating at a system frequency $f_{sys}$. The VSG system 20 includes turbine means, such as a hydro turbine 26, for receiving the energy supplied by resource 22, designated $P_{Ti}$, and for converting the resource energy into rotational mechanical energy, designated $P_T$. The turbine output power is delivered by a shaft 28 to a doubly fed generator 30 of the VSG system 20, so that the generator 30 is driven by the turbine 26.

The energy conversion system of the present invention is illustrated as receiving hydro energy from resource 22. However, the illustrated VSG system 20, and the associated control method described further below, are capable of producing electrical energy from other resources, such as, wind or solar energy. For example, hydroturbines are typically controlled by the variables of head and gate position. These variables are analogous to wind speed and blade pitch angle of wind turbines having blade means for converting the wind into rotational mechanical energy.

In the wind turbine example, typically wind turbines include resource energy adjustment means such as turbine blades with an adjustable pitch angle. In a solar energy application using solar panels to catch the sun's rays, the resource energy adjustment means includes means for adjusting the solar panels to adjust the angle of incidence of the solar rays on the panels. Other devices may also be used for adjusting the energy delivered from a resource to the turbine means. In the hydro example, the resource energy adjustment for turbine setting means includes means for opening and closing gates for controlling the flow of water to the turbine. In a steam turbine generation system, gate valves are provided to limit the flow of steam to the turbine.

If fossil fuels, such as coal and oil, are the resources 22 supplying the resource energy, an auxiliary boiler system (not shown) may also be required to produce steam for supply to the turbine 26 which would be a steam turbine. Other conventional turbine means are also suitable to supply the turbine output power $P_T$, for example, gas turbines or an internal combustion engine. Thus, the terms turbine and turbine means as used herein are broader than the conventional meanings, and include any prime mover means for converting resource energy into rotational mechanical energy, such as by an internal combustion engine or a reciprocating engine.

However, the energy conversion system of the present invention advantageously facilitates economical electricity production from the non-fossil, alternative energy resources such as hydro, wind, geothermal and solar. These alternative energy resources are often erratic in their supply of energy. Thus, these alternative resources are not well suited for use in driving a conventional turbine-synchronous generator set which must rotate at a single synchronous speed.

The doubly fed generator 30 has a set of excitation windings and a set of power windings which are connectable to the electric power grid 24. The doubly fed generator 30 has a rotor with rotor windings 32, shown schematically as the inner circle of generator 30. The rotor windings 32 of the illustrated embodiment serve as the excitation windings. The rotor is driven by the rotational mechanical energy or turbine output power $P_T$ via shaft 28 at a rotor speed, indicated as an angular rotor speed by $\omega_m$. The VSG system 20 also has energy converter means, such as a power electronic converter 34, for receiving a converter control signal and for producing the excitation power in response to the converter control signal. The rotor excitation windings 32 receive excitation power from the converter 34. To accomplish this the rotor includes means, such as brushes and slip rings, for applying the excitation power from the converter 34 to the rotor windings 32. The reactive component $P^{VAR}$ of the VSG system 20 output power and the rotor speed $\omega_m$ are controlled by varying the excitation of the generator 30 as described further below.

The doubly fed generator 30 also includes a stator with stator windings 36, shown schematically as the outer circle of generator 30. The stator windings 36 of the illustrated embodiment are the power windings of the generator. The stator windings 36 are connected to the electric power grid 24 by a switch means, such as power circuit breakers (not shown). The output current of a three-phase stator winding is indicated as $i_a^s$, $i_b^s$ and $i_c^s$, and the output electrical power of the stator is indicated as $P_e^s$. Other polyphase doubly fed generators may also be used, such as a two phase generator for supplying two phase power to a two phase grid.

The converter 34 produces the excitation power from an excitation power source according to a converter control signal, described in further detail below. The excitation power source may be any source capable of supplying the power required by the system, such as a separate excitation scheme shown in FIG. 2. The external excitation power source 37 may be the power grid, a battery source, or a separate generator. Such a system represents an alternative embodiment discussed further below.

A tapped excitation scheme is illustrated in FIG. 1, where the excitation power source is the doubly fed generator output power $P_e^s$. Tapping means, indicated generally as 38, are provided for tapping a portion of the electrical power output $P_e^s$ from the stator windings of the doubly fed generator. The tapping means 38 are also used for supplying the tapped portion, designated $P_e^r$, of the electrical output power to the converter 34. Thus, with the tapped excitation scheme, the actual electrical power output $P_{eo}$ of the VSG system 20 available for supply to the grid 24 is equal to the stator output power $P_e^s$ less the tapped portion $P_e^r$ supplied to converter 34.

The converter 34 converts the power received from the excitation power source, $P_e^r$, into excitation power according to a converter control signal to excite the doubly fed generator 30. The illustrated embodiment of the converter 34 operates in a controllable current source mode, that is, the excitation power inputs to the illustrated three-phase rotor winding 32 are in terms of current signals, $i_a^r$, $i_b^r$ and $i_c^r$. In a synchronous mode of operation at a synchronous speed, the rotor windings 32 carry DC current, and the doubly fed generator acts as a synchronous generator. Therefore, the system of the invention provides flexibility as it can be operated in a synchronous mode, as well as in undersynchronous and oversynchronous modes.

The control scheme and operation of the present invention could be applied to a converter 34 operating in a controllable voltage source mode. In the voltage mode, the converter control signal contains information about the voltages which are to be applied to the rotor windings 32. However, a converter operating in the voltage mode can include an additional shaft speed sensor and stabilizer means for damping undesirable rotor speed oscillations due to negative damping torques which a doubly fed generator exhibits at certain speeds.

Figure 3:
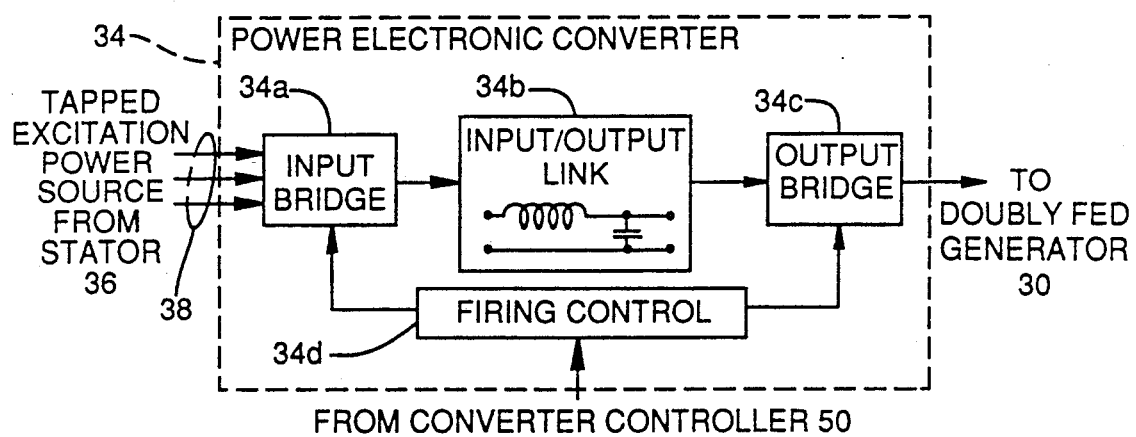
FIG. 3 is a schematic block diagram of one form of a power electronic converter of the present invention.

The principles of this invention apply to the use of any type of energy conversion means or converter, such as a rotating exciter. However, a power electronic converter 34 is illustrated for its high response speed and flexibility. FIG. 3 shows a schematic diagram of a power electronic converter 34 suitable for use with the present invention and a variety of such power electronic converters are commercially available. Another suitable converter is disclosed in U.S. Pat. No. 4,096,557 to Schwarz.

Referring to FIG. 3, the converter 34 comprises an input bridge means 34a for receiving the excitation power from the excitation power source and for conditioning this received power for input to an input/output link means 34b. The input/output link means 34b is typically provided for filtering, typically in the form of a DC filter comprising a series inductor and a parallel capacitor. The filtered output of link 34b is supplied to an output bridge 34c which further conditions the power for exciting the doubly fed generator.

The converter input and output bridges 34a, 34c are comprised of semiconductors, such as MOSFET's, silicone controlled rectifiers (SCR's), thyristors and diodes, the bridges varying by manufacturer in the specific configurations of the semiconductors. Typically, the input bridge 34a is a full or a half wave rectifier, assuming an AC excitation power source, and the output bridge 34c is an inverter bridge. The converter 34 also includes a firing control circuit 34d which controls when the semiconductors of the input and output bridges 34a, 34c trigger to conduct current. The firing control circuit 34d is responsive to a converter control signal, discussed in greater detail below.

Interfacing transformers may also be included with or external to the converter 34 to step-up or to step-down the voltage as required by the particular application. The converter may also be designed to accept an input of DC power, such as from an external battery excitation power source. Also, the excitation output of the converter may be either polyphase AC power or DC power, as required in the event the system is operated in a synchronous mode. Thus, the illustrated power electronic converter 34 supplies power to the rotor windings 32 in both the synchronous and the undersynchronous speed modes. In the oversynchronous speed mode, the converter 34 extracts power from the excitation windings 32.

Referring to FIG. 1, the VSG system 20 is controlled by control means for varying the rotor speed in response to the power output and resource energy input to increase the ratio of the electrical output power to the resource energy input received from the resource. In the illustrated embodiment, the control means comprise variable speed generation controller means, such as VSG controller 40. The VSG controller 40 receives and processes sensed parameters of the VSG system 20 and produces the turbine and converter control signals. Sensor means for sensing the VSG system parameters include turbine input sensor means and generator output sensor means.

Turbine input sensor means 42 is provided for sensing at least one parameter of the resource energy input received by the turbine means 26. For example, in a wind turbine application the resource energy input parameter may be the wind speed. In a solar application, the sensed parameter may be the angle of incidence of the solar rays upon the solar panels. In the illustrated example of a hydro resource, the first sensed resource energy input parameter is the head H or pressure of the hydro resource water supplied to turbine 26. A second parameter is the change of the flow rate Q of the water with respect to a previous flow rate Q° at a certain prior point in time, with the change being designated as ΔQ. The flow rate Q may be measured internal to the turbine, substantially at the point of entry of the water to the turbine or Q may be measured external to the turbine gate, that is, the flow rate of the water just prior to entering the turbine.

The turbine input sensor means 42 produces a turbine input sensor signal proportional to the sensed resource energy inputs to turbine 26. In the hydro resource illustration, the turbine input sensor signal comprises a head signal H∗ and a change in flow rate signal ΔQ∗. The turbine input sensor signals H∗ and ΔQ∗ are received by controller 40 for use in controlling VSG system 20, as described further below.

The generator output sensor means for sensing the doubly fed generator output levels and for producing a generator output sensor signal are illustrated as generator terminal voltage sensor means 44 and generator output power sensor means 46. In the illustrated tapped excitation scheme of FIG. 1, the generator output sensors 44, 46 measure the generator output levels after the tapping means 38 has extracted the required excitation power $P_e^r$ from the stator power output $P_e^s$.

The terminal voltage sensor 44 may be of a conventional design, including means for producing a terminal voltage sensor signal $V_*^s$ proportional to the sensed rms generator terminal voltage $V^s$ according to $$V^s = \sqrt{v_{ab}^2 + v_{bc}^2 + v_{ca}^2}\ .$$

The quantities actually measured are $v_{ab}$, $v_{bc}$ and $v_{ca}$, which are the line to line voltages at the interface of the generator 30 and grid 24. Alternatively, the voltage sensor 44 may be a conventional line to line voltage sensor, including means for producing line to line terminal voltage sensor signals $v_{ab}^*$, $v_{bc}^*$ and $v_{ca}^*$, proportional to the line to line voltages $v_{ab}$, $v_{bc}$ and $v_{ca}$. With a line to line type of voltage sensor, conversion to $V_*^s$ is provided by the VSG controller 40, as discussed further below.

The output power sensor 46 may also be of a conventional design, including means for producing a power output sensor signal $P_{eo}^*$ proportional to the sensed generator output power $P_{eo}$. The terminal voltage and power output sensor signals $V_*^s$ and $P_{eo}^*$ are received and processed by the VSG controller 40 in producing the converter and turbine controller signals.

The turbine means 26 includes input resource energy adjustment or turbine setting means, such as an adjustable turbine setting. The resource energy adjustment means is capable of limiting the resource energy received by the turbine means 26 in response to the turbine control signal received from VSG controller 40. Examples of resource energy adjustment means include gates for a hydro turbine or a steam turbine, pitch angle adjustment for a wind turbine having adjustable blade means, and angle of incidence adjustment for solar panels receiving solar rays. In the wind turbine example, the turbine control signal comprises a blade pitch adjustment signal, with the blade means being responsive to the blade pitch adjustment signal to vary the blade pitch and thereby the amount of energy input to the turbine means from the resource. In the solar power application, the turbine control signal comprises an angle of incidence adjustment signal, with the solar panels being movable responsive to the signal to vary the angle of incidence of the solar rays upon the panels.

The VSG controller 40 includes three subcontrollers. One of the subcontrollers is included within turbine signal processing means, such as turbine controller 48, for producing a turbine control signal. The turbine controller 48 includes turbine power subcontroller means, such as a turbine power subcontroller 49, for controlling the adjustable turbine setting. Typical turbine power subcontroller means are commercially available electrohydraulic or mechanical hydraulic turbine governors and their associated governor controls. In the illustrated hydro example, the adjustable turbine setting is the gate position g. Thus, the gate position g can be adjusted to vary the flow rate Q through the turbine, and therefore control the rotational energy output power of the turbine $P_T$ according to a desired power demand dispatch strategy.

Thus, the resource energy adjustment means, such as the hydro gate, is coupled to the variable speed generation controller 40 for receiving the turbine control signal from the turbine controller 48. The resource energy adjustment means are provided for controlling the energy delivered to the turbine means in response to the turbine control signal. In this manner, the variable speed generation controller controls the resource energy which is converted into rotational mechanical energy by the turbine means 26.

Such a dispatch strategy can be, for example, a constant power output, a constant water discharge in the hydro illustration, or simply the maximum power output possible of the VSG system 20. For example, in a constant power output mode, the VSG controller 40 operates to vary the rotor speed to compensate for changes in the resource energy received by the turbine, while also minimizing the generator electrical losses. In another dispatch strategy, the gate position g may be set to a fixed value, such as at a full open position. In this situation, the VSG controller 40 varies the rotor speed to maximize the power generated for the given resource energy received, while also minimizing the electrical losses of the doubly fed generator 30.

The other two subcontrollers of the VSG controller 40 are included within converter signal processing means, such as converter controller 50, for producing a converter control signal. One such subcontroller included within the converter controller 50 is voltage subcontroller means, such as voltage subcontroller 52, for controlling the doubly fed generator terminal voltage in accordance with the dispatch strategy. The voltage subcontroller 52 accomplishes this by producing a maximum excitation amplitude signal. For a converter 34 operating in a controllable current mode, the maximum excitation amplitude signal represents the maximum rotor excitation current amplitude $i_{max}^r$. Controlling the maximum amplitude signal $i_{max}^r$ effectively controls the rms value of the generator terminal voltage $V^s$. The voltage subcontroller 52 maintains $V^s$ according to a certain reference voltage $V_{REF}^s$, within design limits and with respect to the reactive power output $P^{VAR}$ of the VSG system 20, as discussed in further detail below.

The converter controller 50 also includes the third subcontroller of the VSG controller 40, which is rotor speed subcontroller means, such as rotor speed subcontroller 54. The rotor speed subcontroller means is provided for controlling the rotor speed to attain maximum efficiency operation of the VSG system by producing an excitation frequency signal $f^r$. The converter controller 50 further includes signal generator means, such as signal generator 56. The signal generator 56 includes means for generating the converter control signal from the voltage subcontroller 52 amplitude signal $i_{max}^r$ and the rotor speed subcontroller 54 frequency signal $f^r$. For the converter 34 operating in a current mode and for a three phase rotor winding 32, the converter signal comprises the current signals $i_{a*}^r$, $i_{b*}^r$ and $i_{c*}^r$.

The operation of the VSG controller 40 subcontrollers, that is, the voltage subcontroller 52, the rotor speed subcontroller 54 and the turbine power subcontroller 49, as included within the turbine controller 48, will each be discussed separately in detail below. These three subcontrollers essentially operate in parallel, receiving inputs from the VSG system sensors and producing output control signals to control the VSG system. The subcontrollers, as included within the turbine and converter controllers 48 and 50, operate to secure maximum efficiency operation irrespective of varying resource and electric load conditions. The coordination and interaction of these subcontrollers results in a reliable and successful maximum efficiency control scheme, which limits the excitation requirements without severely restricting the rotor speed variation margin. Additionally, the control scheme described below results in a stable operation of the VSG system 20.

However, the control means of the present invention is also capable of operation with a turbine means 26 which does not have resource energy adjustment means, but merely converts the available resource energy into rotational mechanical energy. In such a situation, the VSG controller 40 would not require the turbine controller 48. Such a system may be used, for example, where there is no desire to control the real or active power output of the system.

Also, the voltage subcontroller 52, which includes the voltage regulator 60, is not essential to the operation of the VSG controller 40. Such a system may be used, for example, if there was no requirement to control the reactive power output of the system. If the voltage subcontroller 52 were eliminated from the converter controller 50, the signal generator 56 would set the maximum amplitude signal to some fixed value. In this case, the terminal voltage sensor 44 would also not be required.

The Voltage Subcontroller

The energy conversion generation system 18 also includes voltage reference demand means 57 for producing a generator voltage reference demand signal, such as a generator voltage reference demand signal $V_{REF}^s$. This generator voltage reference demand signal corresponds to the reactive power output demand which may be established in accordance with the desired dispatch strategy.

The voltage subcontroller 52 includes a summer circuit 58 which forms a means for subtracting the terminal voltage sensor signal $V_{*}^s$, representing the rms value of the terminal voltage, from the generator voltage reference demand signal $V_{REF}^s$. In this manner, the reactive power output $P_{eo}^{VAR}$ of the VSG system 20 is controlled because the reactive power output is a function of the generator 30 stator terminal voltage. The subtracting of these two voltage signals by the summer 58 results in an output voltage difference signal.

The voltage subcontroller 52 also includes a voltage regulator means, such as voltage regulator 60, for regulating the generator terminal voltage. The voltage regulator 60 receives the voltage difference signal from summer 58 and produces a maximum excitation amplitude signal. For the illustrated embodiment of a converter 34 operating in a current mode, this maximum excitation amplitude signal is designated $i_{max}{}^r$ and represents a maximum rotor current amplitude component of the rotor winding current received from converter 34. In a synchronous mode of the doubly fed generator 30, the rotor windings 32 carry DC currents, and $i_{max}{}^r$ represents the DC value of the rotor winding currents.

This control scheme is based upon the relation that the rms value of the generator 30 terminal voltage $V^s$ is exclusively controllable by controlling the excitation amplitude signal, $i_{max}{}^r$, or equivalently the rms value $I^r$ of the rotor excitation winding currents. The frequency of the rotor winding currents only affects the rotor speed, in a manner discussed in greater detail below with reference to the rotor speed controller. In this manner, phase angle control of the rotor currents is advantageously not required of the voltage subcontroller 52, as is required by previous control schemes. Thus, the voltage subcontroller 52 flexibly and independently controls the terminal voltage $V^s$ and the active power transfer through the doubly fed generator 30.

Figure 4:
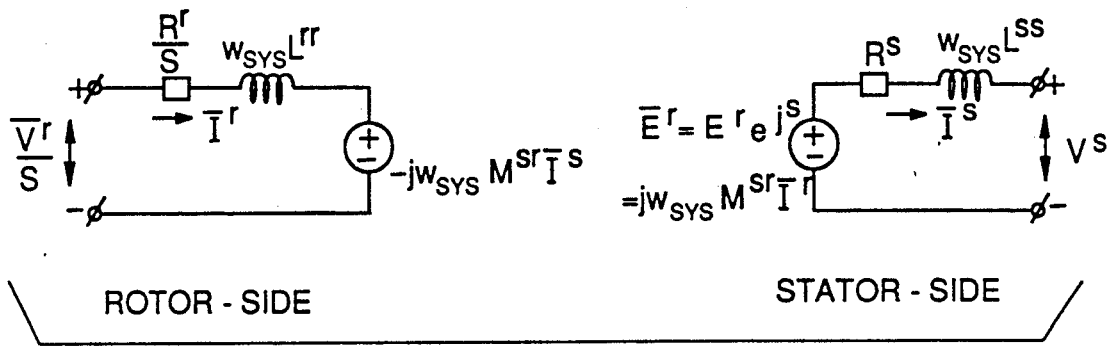
FIG. 4 is a single phase equivalent diagram of one form of a doubly fed generator of the present invention.

These relationships are readily understood from an inspection of the single phase equivalent diagram of the doubly fed generator, shown in FIG. 4. The symbols shown in FIG. 4 are defined as follows: $\omega_{sys}$=angular frequency of the electric power grid 24; $\omega_m$=angular rotor speed of the doubly fed machine; $n_p$=number of pole-pairs; $L^{ss}$=stator self-inductance; $L^{rr}$=rotor self-inductance; $M^{sr}$=mutual stator-rotor inductance; s=slip=$(\omega-n_p\omega_m)/\omega$; $\delta$=the power (torque) angle; $\overline{V}$=voltage phasor; $\overline{I}$=current phasor; V=rms voltage; and I=rms current.

Neglecting for simplicity the core losses of the generator, the rotor-side and stator-side equivalent diagrams of the doubly fed generator are shown in FIG. 4. The stator-side diagram shows that the rotor winding current $\overline{I}^r$ induces a voltage $\overline{E}^r$ on the stator. This relationship indicates that the rms value of the terminal voltage $\overline{V}^s$ can be controlled to any value within design limits by controlling the rotor winding current $\overline{I}^r$.

The equivalent diagram of generator 30 also shows that in the steady state condition, the terminal voltage $V^s$ is not dependent upon the frequency of the rotor winding currents. The induced voltage $E^r$ depends only on $\omega$, which is the fixed angular frequency of the electric power grid 24. From this it is clear that the voltage subcontroller 52 need not include control means for controlling the rotor winding current frequency.

Now considering the relation between the power (torque) angle $\delta$ and the rotor winding current, as expressed in the equation for the electromagnetic torque $T_{em}$ produced by the doubly fed machine 30 under steady state conditions:

$$T_{em} = c_1 I^r V^s \sin(\delta - c_2) + c_3(I^r)^2 \tag{1}$$

The parameters $c_1$, $c_2$ and $c_3$ are constants for any given machine design, and well-known to those skilled in the art. For example, see the text by D. C. White and H. H. Woodson, *Electromechanical Energy Conversion*, John Wiley and Sons, 1959, pp. 225–238. The precise parameters and values of the constants are not particularly relevant to the discussion of the operation of the present invention.

For example, suppose that the generator 30 converts a certain desired mechanical power $P_T$ into electrical power $P_e{}^s$ at a certain desired rotor speed. This then determines the mechanical input torque of the turbine $T_T$ as a ratio of power and speed. Ignoring for simplicity the mechanical losses due to friction, this mechanical input torque $T_T$ is matched by the generator electromechanical torque $T_{em}$ during stable steady state operation. Hence, $T_{em}$ is constrained to be equal to some given value. Consequently, to control the terminal voltage $V^s$ independently from the given mechanical power input, Equ. (1) shows that the rms value for the rotor current $I^r$ cannot be independently controlled from the power (torque) angle $\delta$.

However, the phase angle of the rotor winding current is equal to the quantity $(\delta - \pi/2)$. Therefore, the voltage subcontroller 52 should not include any control means other than means for controlling the rms value of the terminal voltage $V^s$, or equivalently the amplitude of the rotor winding currents. In this manner, independent and parallel control of the terminal voltage and of the energy transfer through the generator 30 is facilitated.

Another task performed by the voltage subcontroller 52 is controlling the reactive power output $P_{eo}{}^{VAR}$ to any desired value within design limits. The reactive power output of the $P_{eo}{}^{VAR}$ of the VSG system 20 is a function of the rms value of the terminal voltage $V^s$ and is controlled by changing $V^s$. Therefore, by setting the reference value of the terminal voltage $V_{REF}{}^s$, as indicated in FIG. 1, to:

$$V_{REF}^s = f(P_{DEMAND}^{VAR}) \tag{2}$$

where "f" denotes a function determined by the generator characteristics, and the actual rms terminal voltage $V^s$ is controlled to track any desired dispatch strategy with respect to the reactive power output.

Figure 5:
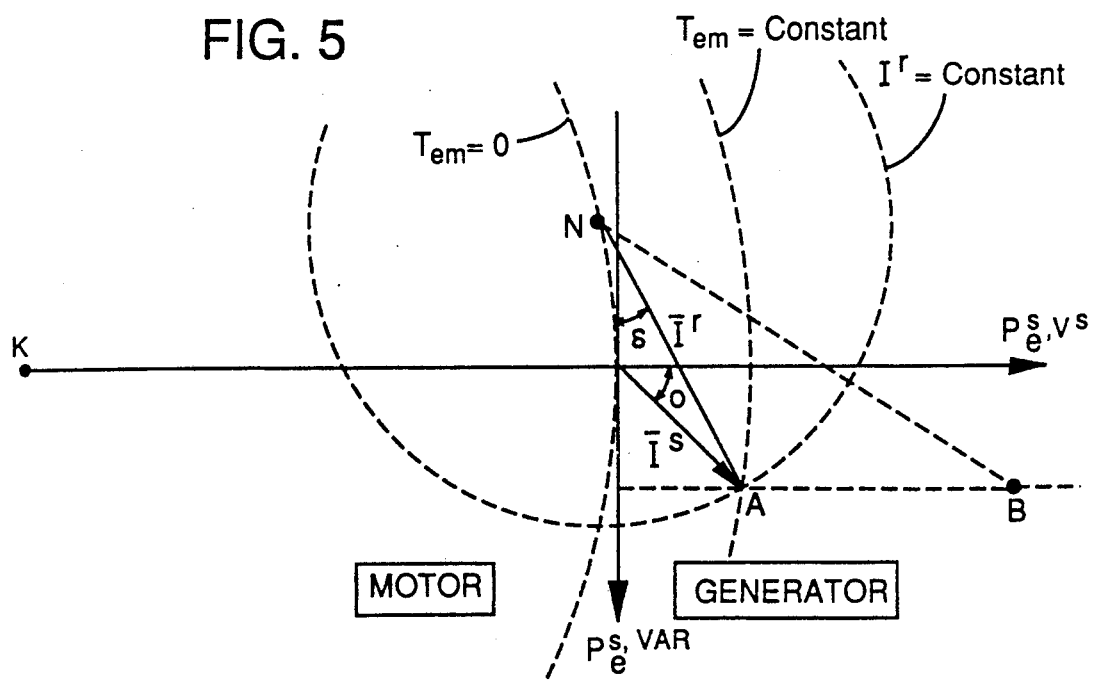
FIG. 5 is a circle diagram of the relationships of one form of a doubly fed machine of the present invention, illustrating various operation modes of the generator under various conditions.

The voltage subcontroller 52 has a response speed that is significantly higher than the rate of change of the resource energy due to varying conditions of resource 22. With this control strategy stable operation of the doubly fed machine is secured, irrespective of varying resource conditions. This concept is illustrated by the circle diagrams of FIG. 5. The variables listed in FIG. 5 are the same as those previously recited for FIG. 4, with the additional variables defined as follows: $\phi$=the power factor angle; K=center of constant $T_{em}$ circles; N=center of constant $I^r$ circles; and A and B indicate operating points of the doubly fed generator for a constant reactive power output.

The circle diagrams illustrate conditions of constant electromagnetic torque $T_{em}$ and constant rms values of rotor winding current $I^r$ under the conditions of constant frequency, phase angle and rms terminal voltage $V^s$. The circle diagrams follow from the doubly fed machine steady state voltage equations of FIG. 4, and from the power balance relations and the electromagnetic torque expression of Equ. (1). Stable steady state operation of the doubly fed machine 30 is possible only if a circle for a constant value of $T_{em}$ intersects a circle for a constant value of $I^r$. The location of this intersection point in the diagram completely defines the operating condition of the doubly fed motor, and is therefore called an operating point.

For example, for the operating point A of FIG. 5, the diagram provides the normalized values of the following quantities of the doubly fed machine 30. The power (torque) angle $\delta$, the active power output $P_e{}^s$, the reactive power output $P_e{}^{s,VAR}$, the power factor angle $\phi$, the stator winding current $I^s$, the rotor winding current $I^r$, and the electromagnetic torque $T_{em}$. If the operating point is located on the right half plane of the diagram, the doubly fed machine is operating as a generator. Operating points on the left half plane of the diagram represent modes of operation with the doubly fed machine running as a motor.

In the generator mode of operation, the power angle $\delta$ must be less than ninety degrees to maintain a stable steady state condition of operation. For example, consider the situation where the rms rotor winding current $I^r$ is held constant, and the electromagnetic torque $T_{em}$ is gradually increased. Let the initial operating mode of the generator correspond with point A on the diagram. Increasing the torque $T_{em}$ while staying on the constant $I^r$ circle will eventually result in a loss of the intersection between the constant $I^r$ and the constant $T_{em}$ circles when the power angle $\delta$ exceeds ninety degrees.

The circle diagram of FIG. 5 illustrates why the steady state stability of the doubly fed machine can be secured by the voltage subcontroller 52 having a significantly higher speed of response than the turbine and rotor speed subcontrollers 49, 54, and higher than the rate of change in the resource conditions. For example, consider a non-varying electric load condition and a given dispatch strategy with respect to the reactive power output of the generator $P_{eo}{}^{s,VAR}$. Under this condition, the reference value of the terminal voltage $V_{REF}{}^s$ is held at a given value. With the voltage subcontroller 52 having the desired high speed of response, the actual terminal voltage $V^s$ can be considered to have a constant value even with varying resource conditions. If the speed of response of the voltage subcontroller 52 is lower than that of the other subcontrollers 49 or 54, or than the rate of change of the resource conditions, then $V^s$ may oscillate with changing speed conditions. In the worst case, this condition may lead to instability problems requiring system shutdown.

Thus, the circle diagram of FIG. 5 is useful in analyzing possible modes of operation with different resource conditions. With the terminal voltage set at the given value, the corresponding operating modes are located along a horizontal line on the circle diagram corresponding to the given reactive power output $P_e{}^{s,VAR}$, for example, the line through operating points A and B. The power (torque) angle $\delta$ for any operating point along the line containing A and B can never exceed ninety degrees, which is the value beyond which the generator would become unstable. Thus, by controlling the generator terminal voltage with the reference demand signal $V_{REF}{}^s$, the reactive power output of the generator $P_e{}^{s,VAR}$ is controlled and stable steady state operation of the generator 30 is assured.

An illustrated embodiment of the voltage subcontroller 52 with the voltage regulator 60 is a dynamic subcontroller which takes into account the dynamics of the doubly fed generator 30, as well as of the converter 34. Since the converter time constants are much lower than the time constants of the generator 30, that is the converter is faster than the generator, the converter time constants may be completely neglected in designing the voltage regulator 60. Such a dynamic voltage subcontroller tracks a change in the reference value of the terminal voltage $V_{REF}{}^s$ with a response speed significantly higher than the response speeds of the turbine and rotor speed subcontrollers 49, 54, and significantly higher than the resource condition rate of change. In a typical application, the voltage regulator 60 speed of response in the order of seconds is reasonable.

Dynamic voltage regulators or controllers of a design which meet the above performance specifications are known to those skilled in the art. Standard root locus or more advanced suboptimal design techniques may be used to design such a voltage subcontroller 52. Implementation and realization of the design is possible using commercially available lead and lag components alone, or in combination with microprocessors. See, for example, *Power System Control and Stability*, Iowa State University Press, Iowa 1977, pp. 236-267, 428-432.

Figure 6A:
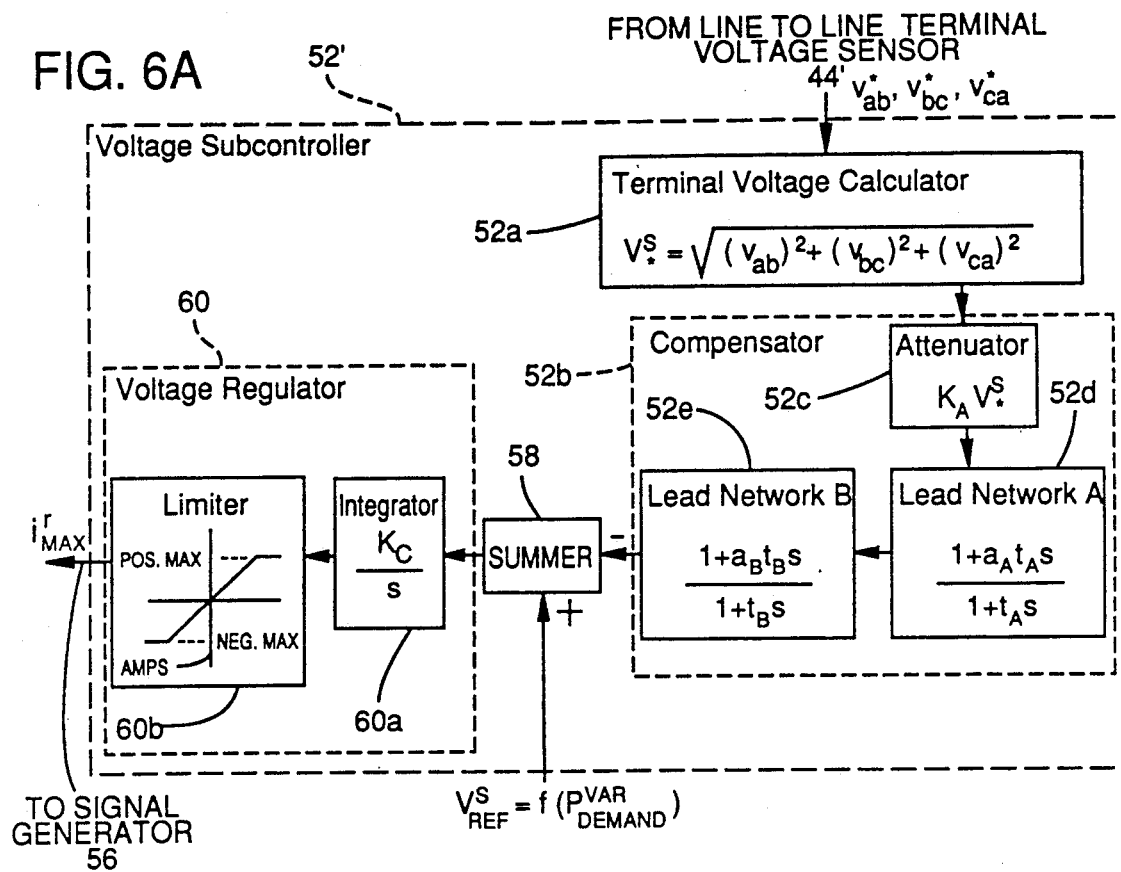
FIG. 6A is a schematic block diagram of one form of an alternative embodiment of a voltage subcontroller of the present invention.

An alternate embodiment of the voltage controller of FIG. 1 is shown in FIG. 6A as 52'. The voltage subcontroller 52' is shown with an optional terminal voltage calculator 52a, which is required when a line to line terminal voltage sensor 44' is used. Such a line to line terminal voltage sensor 44' senses the line to line voltages $v_{ab}$, $v_{bc}$ and $v_{ca}$, and produces signals proportional to these voltages, $v_{ab}{}^*$, $v_{bc}{}^*$ and $v_{ca}{}^*$. These voltage signals are received by the terminal voltage calculator 52a and $V_*{}^s$ is calculated according to the equation shown in FIG. 6A. This equation was previously mentioned during the discussion of the voltage sensor 44. The terminal voltage output $V_*{}^s$ of calculator 52a is sent to a compensator 52b, which aids in smoothing the voltage signals. The illustrated compensator 52b includes an attenuator 52c which receives the terminal voltage signal $V_*{}^s$. The attenuator adjusts the terminal voltage signal by multiplying it with a constant $K_A$, which may be on the order of 0.0032. The attenuated terminal voltage signal output from attenuator 52c is received by two series connected leads networks. The first network 52d is designated lead network A, and the second lead network 52e is designated as lead network B. The lead networks 52d, 52e may be of the circuitry illustrated in FIG. 6B, which depicts lead network A. Lead network B may be of an identical schematic, or an equivalent to that shown in FIG. 6B.

Figure 6B:
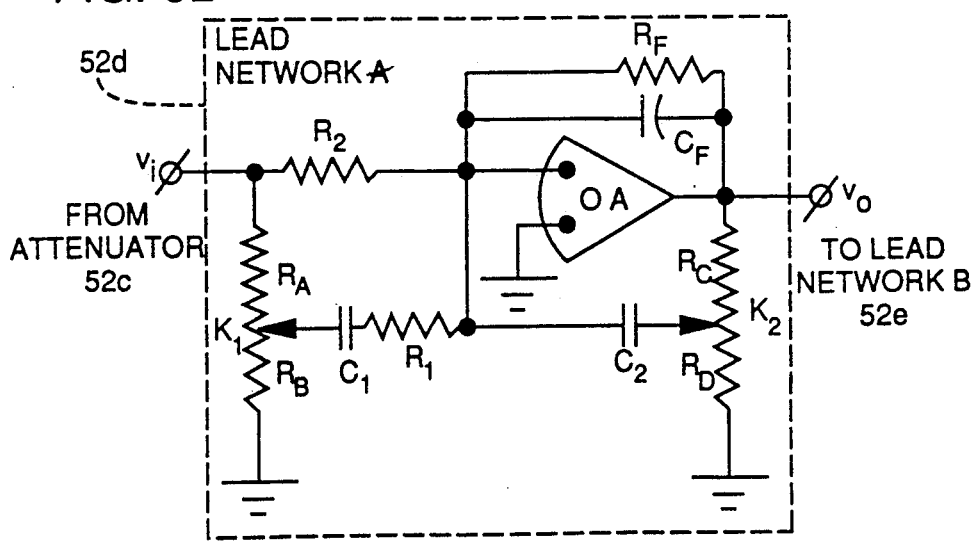
FIG. 6B is a schematic diagram of one form of a lead network in the voltage subcontroller of FIG. 6A.

In FIG. 6B, with the letters "R" denoting resistors, "C" denoting capacitors, and "OA" denoting an operational amplifier, the illustrated lead network 52d maintains the ratio of the output to input voltage $v_o$ to $v_i$ as:

$$\frac{v_o}{v_i} = \frac{1 + a\,ts}{1 + ts}$$

with:
"s" denoting the Laplace transform;
Adjustable Gain:

$$a = \frac{K_1 C_1}{K_2 C_2} > 1$$

Adjustable Time Constants: $t = K_2 R_F C_2$
Potentiometers:

$$K_1 = \frac{R_B}{R_A + R_B}, K_2 = \frac{R_D}{R_C + R_D}$$

The circuit components should be adjusted so that:

$t_1 < t_2$ and $t_F < t$ with:

$t_1 = R_1 C_1,$ $t_2 = K_1 R_F C_1,$ $t_F = R_F C_F$

In the illustrated embodiment of the series combination of the first and second lead networks 52d and 52e in compensator 52b, the respective output to input voltage ratios are:

$$\text{Lead Network } A: \frac{v_{oA}}{v_{iA}} = \frac{1 + a_A t_A s}{1 + t_A s}$$

$$\text{Lead Network } B: \frac{v_{oB}}{v_{iB}} = \frac{1 + a_B t_B s}{1 + t_B s}$$

In adjusting these variables, the gain $a_A$ of the first lead network 52d is greater than one. The time constant for the first lead network $t_A$ is on the order of one to ten milliseconds. For the second lead network 52e, the gain $a_B$ is very high, that is, much greater than one. The time constant $t_B$ for the second lead network 52e is very low, such as on the order of 0.1 milliseconds.

The output from the lead network B of compensator 52b is applied to summer 58, where it is subtracted from an operator-supplied stator voltage reference signal $V_{REF}{}^s$ to produce a voltage difference signal. The voltage difference signal is received by the voltage regulator 60, which is illustrated in greater detail in FIG. 6A. The voltage regulator 60 includes an integrator 60a which receives the voltage difference signal from summer 58 and integrates it according to the equation: ($K_C/s$), with the variable "s" denoting the Laplace transform. In the illustrated embodiment, the value for $K_C$ may be 40 or a lower value.

The voltage regulator 60 also includes a limiter 60b which receives the output from integrator 60a. Limiter 60b functions to limit the voltage regulator 60 output $i_{max}{}^r$ between positive and negative maximum values. In the illustrated embodiment, the maximum current value may be a positive 400 amperes, while a minimum value may be a negative 400 amperes.

The illustrated voltage subcontroller 52' of FIG. 6A has a negligible steady state error due to the integrator 60a inserted in the voltage regulator 60. The compensator 52b of voltage subcontroller 52' suppresses the aggravation of dynamic oscillations due to relatively small disturbances in the electric power grid 24.

The design of such a dynamic voltage subcontroller 52 need not include reactive power output control means. The voltage subcontroller 52 functions to establish a steady state operation target. Thus, if a voltage controller with a relatively slow speed of response is used, an artificial delay will need to be introduced to the rotor speed subcontroller 54.

The Rotor Speed Subcontroller

Referring to FIG. 1, the rotor speed subcontroller 54 receives and processes a generator output sensor signal, a turbine input sensor signal and the turbine control signal g* from the turbine controller 48. In the illustrated hydro application the rotor speed subcontroller 54 receives the following sensor signal inputs: the VSG system 20 active power output $P_{eo}*$, the head H*, and the change of flow rate $\Delta Q*$ with respect to a previous flow rate at a certain previous point in time, $Q°$. In an alternate turbine embodiment discussed further below, only the $P_{eo}*$ input signal is required. The rotor speed subcontroller 54 produces an excitation frequency output signal $f^r$ which represents the frequency of the rotor winding currents for a converter 34 operating in a current mode. Controlling the frequency $f^r$ by the rotor speed subcontroller 54 is tantamount to controlling the rotor speed. This follows when the following steady state relation is satisfied:

$$n_p \omega_m / 2\pi = F_{sys} - f^r \qquad (3)$$

where $\omega_m$ is the angular rotor speed, $n_p$ is the number of pole-pairs and $f_{sys}$ is the frequency of the electric power grid 24.

Figure 7:
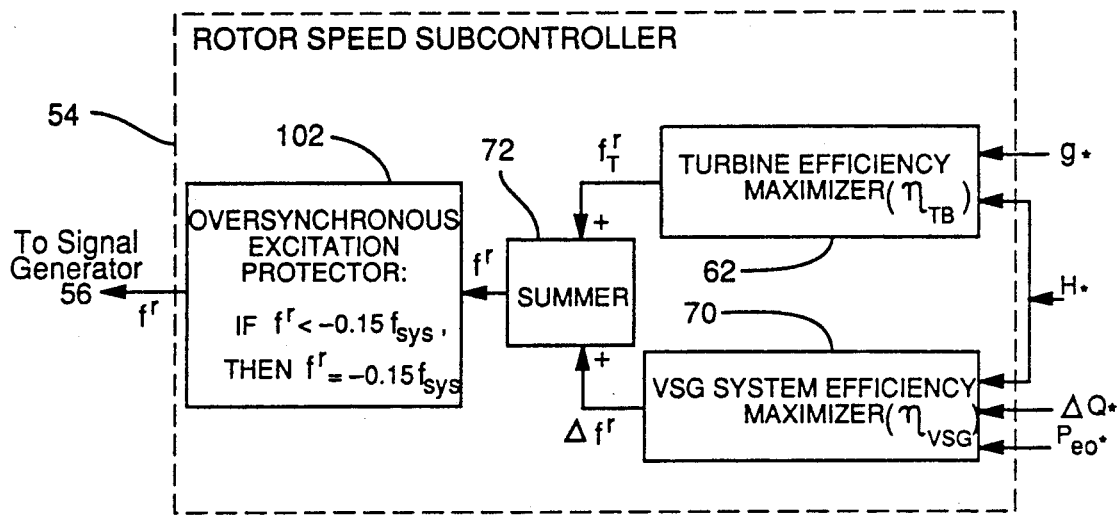
FIG. 7 is a schematic block diagram of one form of the rotor speed controller of FIG. 1 of the present invention.

Referring to FIG. 7, an illustrated embodiment of the rotor speed subcontroller 54 has turbine efficiency maximizer means, such as the turbine efficiency maximizer 62, for maximizing the efficiency of the turbine, $\eta_{TB}$. The turbine efficiency maximizer receives the turbine input sensor signal, comprising the head signal H* in the hydro illustration, and the turbine control signal, comprising a gate position control signal g* for the hydro turbine 26, to which the turbine gate means is responsive. From these inputs, the turbine efficiency maximizer 62 produces a rotor winding current frequency $f_T{}^r$, which would provide maximum turbine efficiency, designated $f_T{}^r$. The turbine efficiency maximizer 62 determines the turbine rotor speed $\omega_{mT}$ and the corresponding rotor winding current frequency $f_T{}^r$ to yield maximum efficiency operation of the turbine 26, irrespective of varying resource energy conditions. For hydro energy, the maximization is obtained for any given gate position g irrespective of head conditions, while for wind energy, the corresponding quantities are pitch angle of the wind turbine blade means and wind speed.

Figure 8:
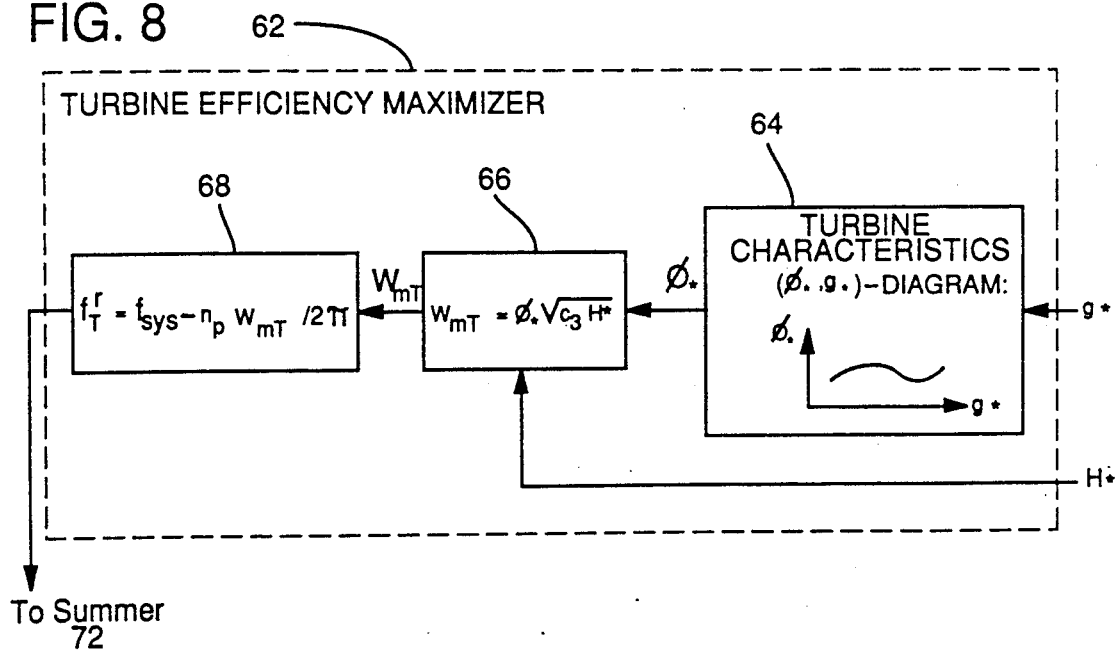
FIG. 8 is a schematic control block diagram of one form of the turbine efficiency maximizer of FIG. 7 of the present invention.

The illustrated turbine efficiency maximizer is shown in greater detail in FIG. 8 including turbine characteristics storage means, illustrated as a turbine characteristics block 64, for storing the input/output characteristics of the turbine. The turbine characteristics storage means 64 also includes matching means for matching the turbine control signal with the input/output turbine characteristics to produce a turbine characteristics output signal. In the hydro illustration, the turbine control signal g* for adjusting the gate position g is received by a turbine characteristics block 64. The turbine characteristics storage means 64 stores the relationship between gate position g* and the variable $\phi*$ and matches the gate position control signal with the variable to produce a turbine characteristics output signal. As shown in FIG. 9b, $\phi$ equals the rotor speed divided by the square root of the product of constant $c_3$ and the head, H. This ($\phi*, g*$) diagram depicts the points of maximum efficiency of the turbine, and is derived from the graph shown in FIG. 9a. The variables shown in FIG. 9 have been previously defined, and constants $c_1$, $c_2$ and $c_3$ reflect physical parameters of a turbine used in a particular application. The precise values of these constants are available from the turbine manufacturer, however, these values of $c_1$, $c_2$ and $c_3$ are not critical to practicing the principles of this invention.

Figure 9A:
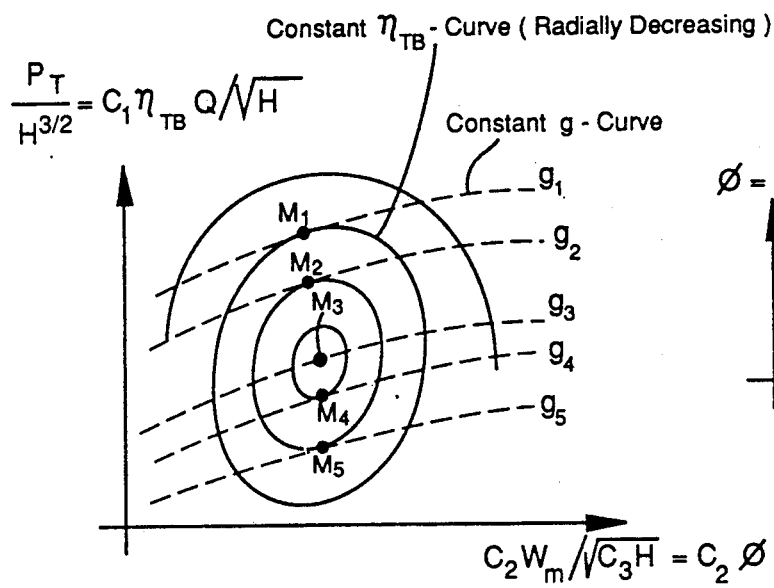
FIG. 9($a$) is a graph of typical turbine characteristics of one form of a turbine of the present invention, with five turbine gate positions labeled $g_1$–$g_5$, while FIG. 9($b$) is a graph illustrating the maximum turbine efficiency for the gate positions of FIG. 9($a$), and FIG. 9($b$) is typical of the graph included in FIG. 8.
Figure 9B:
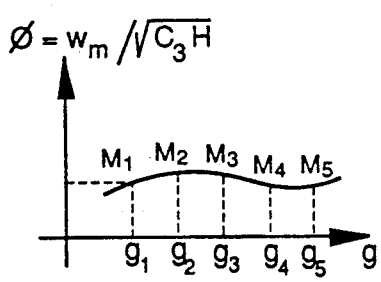

A graph such as shown in FIG. 9a is drawn from turbine data specifications obtained from turbine manufacturers regarding the operational characteristics of the particular turbine. Constant turbine efficiency circles are plotted in FIG. 9a, along with gate position lines $g_1$ to $g_5$. The points $M_1$ to $M_5$ indicate the conditions of maximum turbine efficiency operation for each of the gate positions $g_1$ to $g_5$. These points are then plotted in FIG. 9b, which depicts the data stored in the turbine characteristics block 64 of the turbine efficiency maximizer 62.

Thus, the characteristics for a particular turbine, illustrated with the ($\phi*, g*$) diagram may be stored in a signal processor. For any given turbine controller 48 output signal $g*$, a corresponding value of the variable $\phi*$ is obtained as an output signal from the turbine characteristics block 64.

The turbine efficiency maximizer 62 also includes a rotor speed $\omega_{mT}$ block 66. The $\omega_{mT}$ block produces an $\omega_{mT}$ output signal by determining the angular rotor speed required for maximum turbine efficiency $\omega_{mT}$ from the head signal input $H*$ and the $\phi*$ signal. This angular rotor speed $\omega_{mT}$ is determined from the equation shown on the vertical axis of the graph in FIG. 9b and also from the horizontal axis equation of FIG. 9a.

For the VSG controller 40 embodiment, which does not include a turbine controller 48, perhaps because the turbine means 26 does not include resource energy adjustment means, there will be no turbine control signal provided for input to the turbine characteristics block 64. In this embodiment, the turbine characteristics block 64 would not be required. In this situation, the value of the variable $\phi*$ will be set by the rotor speed block 66 to some fixed value. The only input then in this embodiment to the turbine efficiency maximizer 62 is, in the hydro example, the head signal input.

The output signal $\omega_{mT}$ from block 66 is supplied to a rotor winding frequency for attaining maximum turbine efficiency $f_T^r$ block 68. Block 68 produces a rotor frequency signal for maximum turbine efficiency, $f_T^r$ from the relationship given in Equ. (3) above.

The rotor speed subcontroller 54 also includes VSG system efficiency maximizer means 70 for maximizing the efficiency of the VSG system 20, $\eta_{VSG}$. The VSG system efficiency maximizer 70 receives the turbine input sensor signal, for the hydro illustration comprising the head signal $H*$ and the change in flow rate signal $\Delta Q*$, and a generator output sensor signal comprising the power output signal $P_{eo}*$. From these inputs, the VSG system efficiency maximizer 70 produces a change in rotor frequency signal $\Delta f^r$ for attaining maximum efficiency of the VSG system, described in further detail below.

The rotor speed subcontroller 54 also includes a summer means 72 for combining the rotor winding current frequency signals $f_T^r$ for maximum turbine efficiency and $\omega f^r$ for maximum VSG system efficiency. The output of the summer 72 is the rotor frequency signal $f^r$. This control scheme is required due to the peculiar characteristics of the doubly fed generator 30. For example, the rotor winding current frequency $f_T^r$ at which the turbine efficiency is maximized, is not equal to the frequency at which the doubly fed generator losses are minimal. Thus, a trade off between these efficiencies is balanced by the rotor speed subcontroller 54 to attain maximum efficiency of the overall energy conversion system 18. The following will first cover the data acquisition aspects of securing maximum efficiency of the VSG system 20.

The efficiency of the VSG system 20 is equal to the product of the turbine efficiency $\eta_{TB}$ and the efficiency of the doubly fed machine $\eta_{DF}$. Referring to the VSG system 20 power flow shown in FIG. 1, the following relationships are obtained:

$$\eta_{TB} = P_T/P_{Ti} \quad (4)$$

$$\eta_{DF} = (P_T - P_{Loss}^{s,r})/P_T$$

$$\eta_{VSG} = (\eta_{TB})(\eta_{DF}) = (P_T - P_{Loss}^{s,r})/P_{Ti}$$

where $P_{Loss}^{s,r}$ is equal to all of the doubly fed machine losses, including the converter 34 losses. However, securing maximum efficiency operation of the VSG system with this formula would require cumbersome measurements of the turbine input and output powers $P_{Ti}$ and $P_T$, in addition to measurements of the generator 30 and converter 34 losses.

The above cumbersome implementation is avoided by recognizing that in the tapped excitation system of FIG. 1 that the machine and converter loss are related as:

$$P_T - P_{Loss}^{s,r} = P_{eo} = P_e^s - P_e^r \quad (5)$$

Thus, the efficiency of the VSG system is determined from:

$$\eta_{VSG} = P_{eo}/P_{Ti} \quad (6)$$

with the active electric power output $P_{eo}$ measured by the output power sensor 46. Therefore, signals representing the turbine power output $P_T$ and the machine and converter losses $P_{Loss}^{s,r}$ are not required to secure maximum efficiency operation of the VSG system 20. As explained further below, measurement of the turbine input power $P_{Ti}$ is also not required to attain this maximum efficiency.

Figure 2:
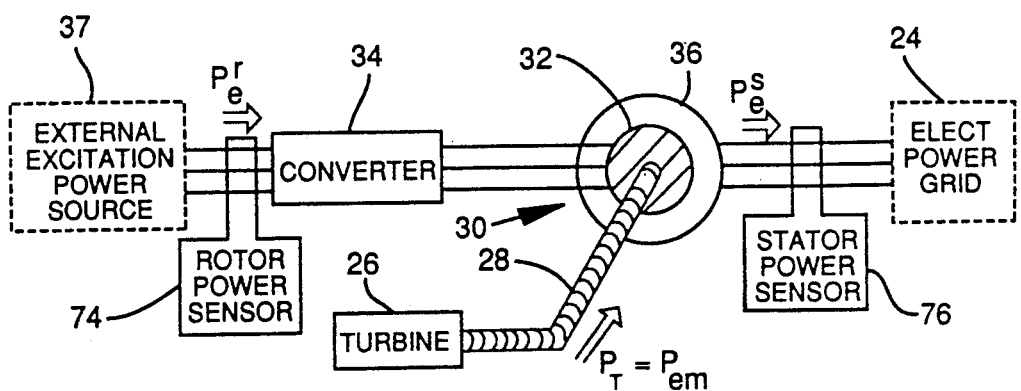
FIG. 2 is a schematic block diagram of an alternative VSG system of the present invention illustrating one form of a separate excitation power source for the VSG system.

The discussion and derivations of equations above were based upon the tapped excitation scheme shown in FIG. 1. An alternative separate excitation scheme is shown in FIG. 2, with the external excitation power source 37 supplying the converter 34. In this separate excitation scheme, the active electric power output $P_{eo}$ in the efficiency formula of Equ. (6) is the net active electric power output. That is, $P_{eo}$ is determined from $P_e^s$ and $P_e^r$ according to Equ. (5). The rotor excitation power $P_e^r$ is monitored by a rotor power sensor 74, while the power output of the stator $P_e^s$ is monitored by a stator power sensor 76. The rotor and stator power sensors 74, 76 may be of the same type as the output power sensor 46, discussed previously.

The peculiar characteristics of the doubly fed generator 30 require a rotor winding current frequency adjustment $\Delta f^r$ to attain maximum efficiency of the VSG system 20. The extent of the adjustment $\Delta f^r$ required is determined by investigating the effect of the rotor winding current frequency $f^r$ on the VSG system efficiency $\eta_{VSG}$. From Equ. (4), the machine losses $P_{Loss}^{s,r}$ are required to determine $\eta_{VSG}$.

Referring to FIG. 5, given a non-varying electric load condition and desired dispatch strategy with respect to the reactive power output $P_e^{s,VAR}$ the operating modes for varying resource conditions are located on a horizontal line in the circle diagram. The location of this horizontal line depends upon the given reactive power output, and is illustrated as a line through operating points A and B. From the stator and rotor currents at these operating points, the machine losses $P_{Loss}^{s,r}$ at operating point A are less than that at operating point B. This is because the machine losses $P_{Loss}^{s,r}$ are proportional to the sum of the squared values of stator and rotor currents.

The circle diagram also shows that the electromagnetic torque $T_{em}$ at operating point A is less than that at operating point B. Therefore, the doubly fed machine losses are also proportional to the electromagnetic torque $T_{em}$. Moreover, a stable steady state operation is possible only when the electromagnetic torque $T_{em}$ equals the turbine output torque $T_T$. Therefore, the doubly fed machine losses $P_{Loss}{}^{s,r}$ are also proportional to the turbine output torque $T_T$.

Thus, consideration of the power or torque-speed characteristic of the turbine output is required to determine the influence of the rotor winding current frequency on the VSG system efficiency $\eta_{VSG}$. From Equ. (3), if the rotor speed is known, the rotor winding current frequency is also known.

There are two major types of turbines, type (A) turbines and type (B) turbines, each having different power-speed characteristics. In a type (A) turbine, for any gate position g, the maximum power output $P_{T,max}$ occurs with the maximum turbine efficiency $\eta_{TB}$ at a certain rotor speed. Type (B) turbines are all the remaining turbines not classified as a type (A) turbine. For example, in the hydro illustration, a type (A) turbine is a Francis turbine, whereas a type (B) turbine is a Kaplan turbine.

Figure 10A:
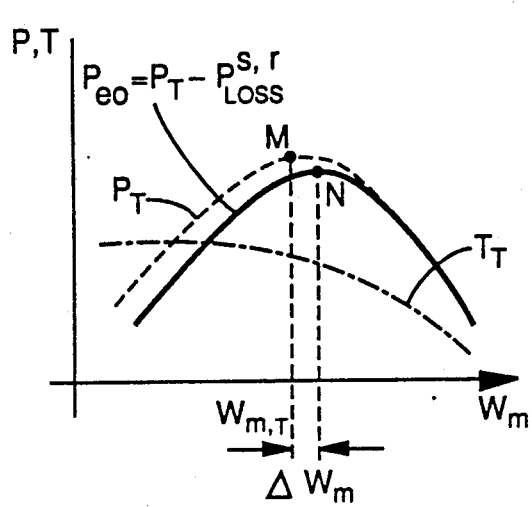
FIGS. 10($a$) and 10($b$) are graphs each illustrating the power speed characteristics of one of two classes of turbines of a VSG system of the present invention, illustrating the characteristics of turbine power output and active power output of the VSG system.

FIG. 10a shows the power-speed characteristics of a type (A) turbine for a certain head H and gate position g. The turbine torque $T_T$, which is equal to the ratio of power and speed, is also shown as a function of speed in the graph. These curves illustrate that the maximum turbine output power rotor speed $\omega_{mT}$ at point M is not equal to the rotor speed corresponding to the maximum active electric power output $P_{eo}$ at point N. These two speeds differ by $\Delta\omega_m$, because the torque-speed characteristic shows torque $T_T$ decreasing with an increase in speed. Since the machine losses $P_{Loss}{}^{s,r}$ are proportional to the turbine torque $T_T$, the doubly fed machine losses will also decrease with an increase in speed.

In FIG. 10a, point M indicates the maximum turbine output power, and can also be considered to indicate the maximum efficiency operation of the turbine 26. This is a typical characteristic of a type (A) turbine. Likewise, point N of FIG. 10 can also be considered to indicate the maximum efficiency operation of the VSG system 20. These considerations justify the rotor speed subcontroller 54 strategy, where the turbine efficiency maximizer 62 controls the rotor winding current frequency $f_T{}^r$ corresponding to the rotor speed $\omega_{mT}$ from Equ. (3). The VSG system maximizer 70 adjusts this frequency with a change in rotor frequency signal $\Delta f^r$. The $\Delta f^r$ signal corresponds to a rotor speed adjustment $\Delta\omega_m$ which maximizes the active electric output power $P_{eo}$.

Since the doubly fed machine losses $P_{Loss}{}^{s,r}$ decrease with an increase in rotor speed, the VSG system efficiency maximizer 70 adjustment is always in the direction of increasing the rotor speed $\omega_m$. Equivalently, from Equ. (3), the VSG system maximizer adjustment will also be in the direction of decreasing the rotor winding current frequency $f^r$. Implementation of these properties is shown in the illustrated VSG system maximizer 70 of FIG. 11.

Instead of a sophisticated maximization process, the present invention is based upon decreasing the rotor winding current frequency in a stepwise fashion from the value of $f_T{}^r$, with steps designated $\Delta f^r$. The stepwise process includes a time delay of $t_{ss}$ seconds between each successive step. The time delay $t_{ss}$ allows the rotor speed to settle to a near steady state condition between the stepped changes of the rotor winding current frequency $\Delta f^r$.

The time delay $t_{ss}$ is chosen in relation to the step size of the frequency change $\Delta f^r$. This step size must be large enough to allow time for the VSG system maximizer 70 to complete its task. However, to avoid instability problems, the step size has an upper limit. For example, a step size $\Delta f^r$ of 0.1 Hertz (Hz), and a delay of ten seconds for $t_{ss}$ is appropriate in most practical cases, considering the normal range of the natural frequency of turbine-generator systems.

Figure 11:
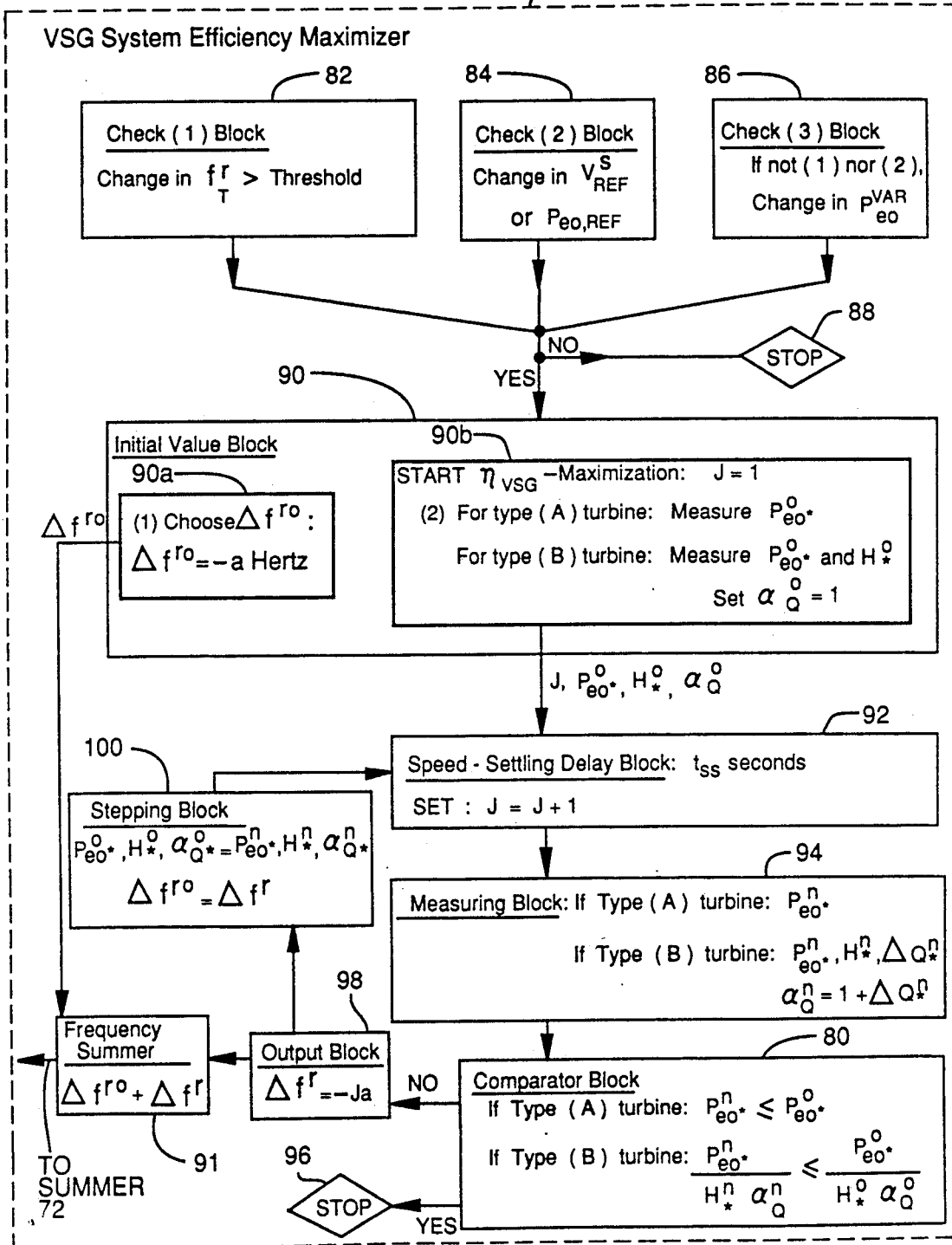
FIG. 11 is a control flow diagram of one form of the variable speed generation efficiency maximizer of FIG. 7 of the present invention.

An effective alternative approach involves decreasing the step size $\Delta f^r$, rather than having a fixed step size. The VSG system efficiency maximizer 70 task is complete upon termination of the stepwise decrease of the rotor winding current frequency. Referring to FIG. 11, the VSG system efficiency maximizer 70 includes a comparator block 80 which determines when this stepwise decrease of the excitation frequency is terminated. Thus, for a type (A) turbine, the comparator block 80 determines that termination occurs when the active output power $P_{eo}$ becomes less than the measured active output power value for this power, at completion of the previous frequency step change.

Figure 10B:
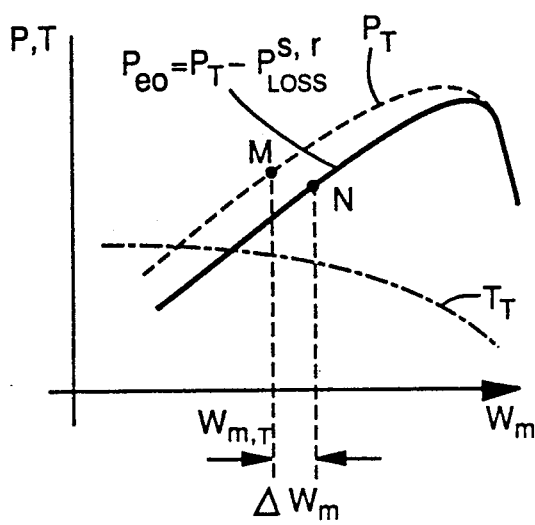

FIG. 10b shows typical power-speed characteristics for a type (B) turbine. The control strategy, the input and output signals, and the task of the turbine efficiency maximizer for this type of turbine are exactly identical to those for type (A) turbines. This is shown in the illustrated embodiments of FIGS. 7 and 8. Thus, a rotor speed $\omega_{mT}$ is established for a maximum turbine efficiency $\eta_{TB}$, as with type (A) turbines. From comparing FIGS. 10a and 10b, both turbine types exhibit similar torque-speed characteristics, that is, torque $T_T$ decreases with a speed increase.

Since the doubly fed machine losses $P_{Loss}{}^{s,r}$ are proportional to the turbine torque $T_T$, increasing the rotor speed by $\Delta\omega_m$ from $\omega_{mT}$ increases the active output power $P_{eo}$. Hence, the same stepwise approach for decreasing the rotor winding current frequency $f^r$ from $f_T{}^r$ by the VSG efficiency maximization process of type (A) turbines is applicable to type (B) turbines.

However, type (B) turbines do not provide a maximum turbine output power at rotor speed $\omega_{mT}$. This is illustrated by a comparison of points M in FIGS. 10a and 10b. Consequently, with type (B) turbines, the variable speed generation system maximizer 70 does not maximize efficiency by maximizing the active output power $P_{eo}$. Instead, the rotor speed $\omega_{mT}$ is further adjusted to secure maximum efficiency operation of the VSG system by maximizing the ratio of the active power output $P_{eo}$ and the turbine input power $P_{Ti}$ according to Equ. (6).

However, measurement of the turbine input power $P_{Ti}$ is very cumbersome and can be avoided. The turbine input power can be expressed as: $P_{Ti} = c_4 H Q$, where H is the head, Q the flow rate, and $c_4$ a constant dependent upon the specific turbine design in use. The precise parameters and value of the constant $c_4$ are not required to understand and implement the pertinent principals of the present invention. Therefore, from Equ. (6), $\eta_{VSG} = c_4 P_{eo}/HQ$. Letting $Q^o$ be the flow rate at initiation of the VSG system maximization process:

$$\eta_{VSG} = (P_{eo}/c_4 H Q^o)(1 + \Delta Q/Q^o) \tag{7}$$

This is the expression for the VSG system efficiency after a step change in the rotor winding current frequency has been initiated, where the change in flow rate $\Delta Q$ is with respect to $Q^o$.

Since $c_4$ and $Q^o$ are fixed during the entire maximization process by a stepwise decrease of the rotor winding current frequency, maximum VSG system efficiency is attained if:

$$P_{eo}/H\alpha_Q = \text{maximum} \qquad (8)$$

with $$\alpha_Q = 1 + \Delta Q \qquad (9)$$

Thus, the VSG system maximizer establishes maximum efficiency operation without measuring the turbine input power $P_{Ti}$ for either type (A) or type (B) turbines. The illustrated maximizer of FIGS. 7 and 11, shows that the input signal required for both turbine types is the active power output $P_{eo^*}$. For type (B) turbines only, the turbine input signals of head $H*$ and change in flow rate $\Delta Q*$ are also required. These additional quantities are conveniently measured by known techniques by the turbine input sensor 42.

In the illustrated variable speed generation system efficiency maximizer means 70 of FIG. 11 includes monitoring means for monitoring or checking for changes in the turbine maximum efficiency excitation frequency signal, the power demand signal, the generator voltage reference demand signal, and the reactive component of the electrical power. The monitoring means also comprises means for selectively activating the VSG system efficiency maximizer if such changes are discovered. The maximizer 70 flow diagram illustrates the monitoring means as three starting condition check blocks, 82, 84 and 86, which do not activate maximizer 70 unless one of the conditions is met. Thus, the VSG system efficiency maximizer 70 includes monitoring means for monitoring or checking for changes in conditions external to the energy conversion generation system 18, including changes in the resource conditions, electrical load of the grid, and dispatch strategy inputs.

The check (1) block 82 prevents activation of the VSG maximizer 70 if no significant change to the resource conditions has occurred. A change in the resource conditions is detected by monitoring the rotor winding current frequency required for maximum turbine efficiency $f_T^r$. That is the output of the turbine efficiency maximizer 62. For example, a threshold value of 0.1 Hz or about 0.2 percent of the synchronous speed is reasonable for most practical cases.

The check (2) block 84 of the VSG system efficiency maximizer 70 activates the maximizer 70 whenever a power demand signal $P_{eo,REF}$ or the generator terminal voltage reference demand signal $V_{REF}{}^S$ settings are changed. Finally, the check (3) block 86 updates the VSG system efficiency maximum value to compensate for electric load changes of the power grid 24. Such load changes are detected by a change in the reactive power output $P_{eo}{}^{VAR}$, when no changes have occurred to the resource conditions of check (1) block 82 or to the demand reference settings of check (2) block 84. For clarity, the input connections to the check blocks 82, 84 and 86 to monitor $f_T^r$, $P_{eo,REF}$, $V_{REF}{}^S$ and $P_{eo}{}^{VAR}$ are not shown in the drawings. In certain applications, it may be appropriate to insert other appropriate threshold values into the second and third check blocks 84, 86, as mentioned for the first check block 82 above.

Thus, if there are no changes detected by the first, second or third check blocks 82, 84 or 86, the VSG system efficiency maximizer 70 is not activated, as indicated by a first stop block 88 of FIG. 11. However, if one or more of check means blocks 82, 84 or 86 detects a change, a starting signal is sent to initial value establishing means, such as initial value block 90 for establishing the required initial values of the parameters set out below.

In a first step, illustrated by block 90a, an initial step change in the excitation frequency signal required for maximum VSG system efficiency, $\Delta f^{ro}$, is established at a negative initial frequency step change value, illustrated as the negative of a certain frequency in Hertz, designated by variable "a". A typical value for the variable "a" is 0.1 Hz. The signal $\Delta f^{ro}$ output of block 90a is sent to frequency summer means, such as a frequency summer block 91, for receiving and summing the initial step change in the excitation frequency signal with the iterated frequency step change signal to produce a step change in the excitation frequency signal, which is the output of maximizer 70.

A second initialization step is illustrated by block 90b, which may be concurrent with the first step. Thus, the initial value establishing means 90 further includes means for setting an iteration step J to an initial iteration step value. For the first step being iterated, J is set equal to an initial iteration step value such as one. The initial value establishing means 90 further includes means 90b for measuring an initial value of the output power sensor signal. This is also illustrated in the second step, for a type (A) turbine, as an initial value of the output power of the VSG system 20, measured by the power output sensor 46 as signal $P_{eo^*}{}^o$. In this second step of block 90b, for a type (B) turbine, $P_{eo^*}{}^o$ is also measured, along with an initial value of the pressure head signal $H*^o$ measured by the turbine input sensor 42. An initial value of the variable $\alpha_Q{}^o$, defined by Equ. (9), is set equal to one.

The initial values measured and set by the block 90b, that is, the variables J and $P_{eo^*}{}^o$ for a type (A) turbine, or variables J, $P_{eo^*}{}^o$, $H*^o$ and $\alpha_Q{}^o$ for a type (B) turbine, are also sent to speed settling delay means, such as a speed-settling delay block 92 of maximizer 70. The speed-settling delay block 92 is provided for establishing the time delay $t_{ss}$ between successive steps, and including means for setting a current step J equal to the previous step J plus one additional step.

The VSG system efficiency maximizer 70 also includes measuring means, such as measuring block 94 for measuring a new value of the output power sensor signal. The measuring block 94 also is generally the location where the measured VSG system and turbine parameters are received. For the particular current step J, set by the speed-settling delay block 92, the following turbine parameters are measured for the new time corresponding to the current value of J. These newly measured values are designated with a superscript n, as opposed to the superscript "o" used to designate the old previous or the initial values.

Once again, for a type (A) turbine, only the output power signal from sensor 46, $P_{eo^*}{}^n$ is measured. For a type (B) turbine, $P_{eo^*}{}^n$ is also measured, along with the turbine input sensor signals for the head $H*^n$ and the change in flow $\Delta Q*^n$. The value of $\alpha_Q{}^n$ is set equal to the change in flow rate $\Delta Q*^n$ plus one, in accordance with Eqns. (8) and (9).

The VSG system efficiency maximizer 70 also includes comparator means, such as the comparator block 80 previously mentioned, for comparing the previous or initial values with the newly measured current values of the VSG system and turbine parameters. For the type (A) turbine, the output power signals are compared. For the type (B) turbine, the values of the output power divided by the product of the head signal and the variable $a_Q$ are compared. If the current measured values, designated by superscript n, are less than or equal to the previously measured or initial values, designated with superscript "o", then a signal is sent to a second stop block 96, and the VSG system efficiency maximizer 70 is no longer activated.

Thus, the comparator means can also be considered as comprising means for stopping the variable speed generation system efficiency maximizer if the new value is less than or equal to the initial value. The comparator means further includes means for producing a comparator output signal if the new value is greater than the initial value of the output power sensor signal.

The maximizer 70 further includes output means, illustrated as an output block 98, for receiving the comparator output signal. The output means further includes means for multiplying the iteration step value by the negative initial frequency step change value to produce an iterated frequency step change signal. For example, if the measured values are greater than the initial values as determined by comparator block 80 further iterations of adjusting steps of $\Delta f^r$ are required and a comparator signal is sent to output block 98. In the output block 98, the change in the rotor frequency signal required for maximum VSG system efficiency, $\Delta f^r$, is set equal to the negative of the product of the iteration step J and the initial step change variable "a", chosen in the second step of the initial value block 90. The $\Delta f^r$ signal is an output of the VSG system efficiency maximizer 70, which is sent to summer 72 of the rotor speed subcontroller 54 to decrease the excitation frequency $f^r$ and increase the rotor speed.

The VSG system efficiency maximizer 70 also includes iteration means for iterating the stepwise change in the excitation frequency until the VSG system reaches maximum efficiency. The iteration means includes stepping means, such as stepping block 100, for setting the old previous values equal to the newly measured current values of the VSG system and turbine parameters, $P_{eo}$, H, $a_Q$ and $\Delta f^r$. Thus, the new values become the old values for subsequent iterations. These newly set values of the parameters designated with superscript "o" are sent from stepping block 100 to the speed-settling delay block 92 to be used in the subsequent J+1 iteration for comparison by comparator block 80.

Referring to FIG. 7, the rotor speed subcontroller 54 has oversynchronous excitation protector means 102 for limiting the excitation requirements of the doubly fed machine 30. The oversynchronous excitation protector means 102 is also provided for reducing the machine and converter losses, allowing the use of a converter 34 having as low a rating as possible. This advantageously allows a more economical converter to be used, thereby reducing the initial costs of the system, and also reduces the operating costs by minimizing losses.

The oversynchronous excitation protector 102 receives the summer 72 rotor frequency output signal $f^r$ and limits it to a certain value, described in greater detail below. However, this limitation of the rotor frequency current signal $f^r$ should not be set to allow for only a small variation in the margin of rotor speed. To make maximum efficiency operation of the VSG system possible under widely varying resource or electric load conditions, a wide rotor speed margin is desirable. Thus, the excitation requirement characteristics as a function of rotor speed are of particular interest, for the turbine 26 to be operated at maximum efficiency for a certain given gate position.

Referring to the doubly fed machine 30 power balance relations shown in FIG. 11, the positive convention of power flow shown corresponds with the power flows of FIGS. 1 and 2. The air gap power $P_{ag}$ is found from the equation: $P_{ag}=T_{em}\omega_{m,sync}$, with $T_{em}$ as the electromagnetic torque and $\omega_{m,sync}$ as the angular synchronous speed. The angular synchronous speed is fixed, and is related to the fixed system frequency $f_{sys}$ of the electric power grid 24, according to the formula: $\omega_{m,sync}=2\pi f_{sys}/n_p$, with $n_p$ being the number of pole-pairs of the doubly fed machine 30.

The electromagnetic power $P_{em}$ satisfies the equation $P_{em}=T_{em}\omega_m$, with $\omega_m$ as the angular rotor speed which can be defined in terms of slip s. In induction machine terminology, the slip is defined as $s=(\omega_{m,sync}-\omega_m)/\omega_{m,sync}$. From these equations, the electromagnetic power is defined in terms of the air gap power as:

$$P_{em}=(1-s)P_{ag} \qquad (10)$$

Figure 12:
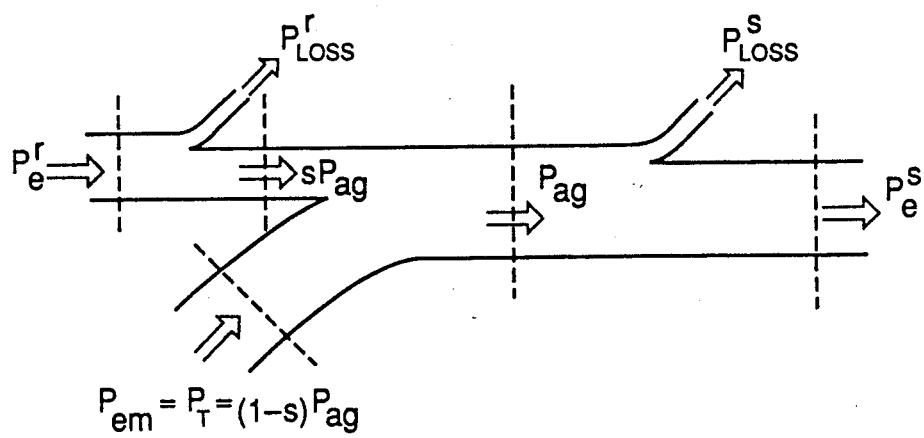
FIG. 12 is a diagram illustrating the power balance relations of one form of a doubly fed machine of the present invention.

For simplicity, assume that the rotor losses $P_{Loss}^r$ of FIG. 12 are minimal, and can be disregarded. From the power balance relations, the required excitation power is: $P_e^r=P_{ag}-P_{em}$. Under stable steady state conditions, the electromagnetic power is matched by the turbine output power, therefore $P_{em}=P_T$. Consequently, the excitation requirements are formulated as:

$$P_e^r=sP_T/(1-s) \qquad (11)$$

Thus, the desired characteristics of the excitation requirements are expressed as a function of slip or equivalently as a function of the rotor speed. Thus, the desired characteristics of the excitation requirements are expressed as a function of slip or equivalently as a function of the rotor speed.

The turbine output power-speed characteristics for maximum efficiency operation at a certain given gate position are obtained from a turbine characteristic graph as shown in FIG. 9a. For example, consider turbine operation at gate position $g_2$ where maximum efficiency operation occurs at point $M_2$, which is characterized by the equations:

$$P_T/H^{3/2}=c_5$$
$$\omega_m//c_3H=c_6 \qquad (12)$$

where $c_5$ and $c_6$ are constants depending upon the particular turbine used. The precise values of these constants are obtainable from the turbine manufacturer, and are not required to understand the principles of the present invention.

By eliminating the variable H for the pressure head in Equ. (12), and using the definition of slip s above, yields the equation:

$$P_T=P_{T,sync}(1-s)^3 \qquad (13)$$

with $P_{T,sync}$ as the turbine output power for gate position $g_2$ if the rotor speed is equal to the synchronous speed $\omega_{m,sync}$, or equivalently if s equals zero. Substituting Equ. (13) into Equ. (11), yields the excitation requirements in terms of $P_{T,sync}$:

$$P_e^r = P_{T,sync} s(1-s)^2 \qquad (14)$$

Figure 13A:
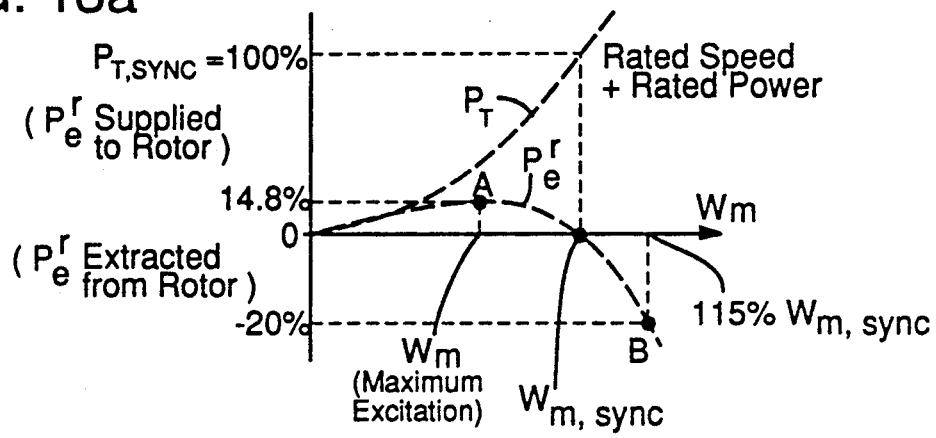
FIGS. 13($a$) and 13($b$) are graphs illustrating the power speed characteristics of one form of the turbine of the present invention operating at maximum efficiency for a fixed turbine gate position.

FIG. 13a illustrates the characteristics of the turbine output power $P_T$ and required excitation power $P_e^r$, neglecting rotor losses, as a function of angular rotor speed $\omega_m$ of the doubly fed machine, reflecting the results of equations (13) and (14) above. For maximum efficiency operation at a given gate position, the excitation power requirement is at most 14.8 percent of the turbine power at synchronous speed $P_{T,sync}$ for undersynchronous rotor speeds. These relationships are illustrated at point A on the graph of FIG. 13a. At oversynchronous speeds above $\omega_{m,sync}$, the excitation requirements become excessively high with increasing speeds. However, if the rotor speed is constrained not to exceed the synchronous by more than fifteen percent, the excitation requirements will be at most twenty percent of the turbine power at synchronous speed $P_{T,sync}$. This is illustrated at point B of the graph of FIG. 13a, corresponding to minus twenty percent $P_{T,sync}$ and one hundred fifteen percent $\omega_{m,sync}$.

FIG. 13a also illustrates that the excitation power $P_e^r$ is supplied to the rotor windings for undersynchronous rotor speeds. For oversynchronous speeds, the excitation power is extracted from the rotor windings, with extraction indicated as negative twenty percent for point B. In deriving the excitation requirements above, rotor losses were neglected. Taking these rotor losses into account has the effect of slightly increasing the excitation requirements in the undersynchronous rotor speed region, so the maximum of 14.8 percent mentioned above is also increased. These rotor losses also have the effect of slightly decreasing the requirements in the oversynchronous rotor speed region. These relationships are also evident in the power balance relationships of the doubly fed machine shown in FIG. 12. This is also true since state of the art machines have a maximum of five percent rotor losses, even when the doubly fed machine is operated at full load.

As a general conclusion, maximum efficiency operation at a given gate position requires excitation power which is either supplied or extracted. Furthermore, this excitation power is well below twenty percent of the turbine output power at synchronous speed, $P_{T,sync}$, for rotor speeds ranging from zero to fifteen percent beyond the synchronous speed.

Now referring to FIG. 7, the rotor speed subcontroller 54 also includes oversynchronous excitation protector means, such as the oversynchronous excitation protector 102, for receiving and limiting the output excitation frequency signal from summer 72. The oversynchronous excitation protector means 102 is also provided for producing the excitation frequency signal output of the rotor speed subcontroller 54. The rotor speed is constrained not to exceed fifteen percent beyond the synchronous speed by the oversynchronous excitation protector 102 of the rotor speed subcontroller 54. If the excitation frequency output of summer 72 is less than fifteen percent of the system frequency, that is, less than the negative value of $0.15f_{sys}$, the excitation frequency output of the rotor speed subcontroller 54 is set to the negative value of $0.15f_{sys}$ by the oversynchronous excitation protector 102.

Moreover, referring to FIG. 13a, to constrain the excitation requirements to within twenty percent of the desired limit with respect to the maximum turbine output power $P_{max}$, the gate position is simply constrained not to exceed a certain maximum gate value $g_{max}$. This value is the gate position at which $P_{T,sync}$ is identical to $P_{max}$.

Figure 13B:
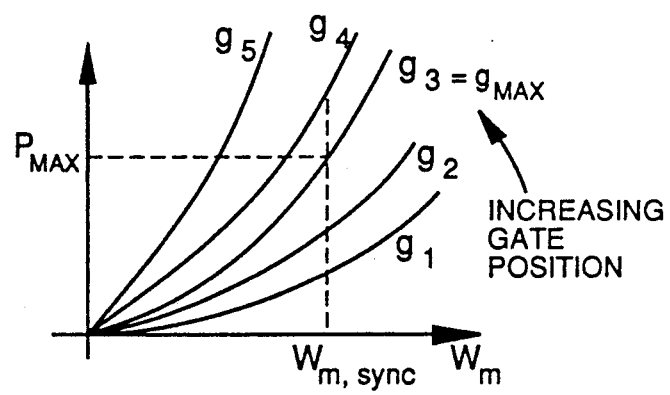

To illustrate this, consider the power speed characteristics at different gate positions where the turbine is operated at maximum efficiency. These characteristics are shown in FIG. 13b, with the maximum gate position $g_{max}$ at $g_3$. At gate position at $g_3$, the synchronous speed $\omega_{m,sync}$ produces the turbine output power equal to $P_{max}$ if the turbine 26 is operated at maximum efficiency. The gate position is limited to $g_{max}$ by the turbine controller 48, as described further below.

The rotor speed subcontroller 54 of FIGS. 7, 8 and 11 can be easily implemented with microprocessors. These microprocessors may be conveniently designed by means of bit slice development systems. Only multiplicative and additive operations are needed, in addition to simple logic equations and straightforward data storage for the turbine characteristics ($\phi *$, $g *$) diagram block 64 of the turbine efficiency maximizer 62 of FIG. 8. An alternative implementation of the rotor speed subcontroller 54 with analog components would only require operational amplifiers, limiters, single function generators and a number of comparators.

The Turbine Power Subcontroller

The energy conversion generation system 18 also includes power demand means 103 for producing a power demand signal $P_{eo,REF}$. This input $P_{eo,REF}$ equals the demand power $P_{DEMAND}$ which is set by any desired dispatch strategy with respect to the real or active output power.

Referring now to FIG. 1, an illustrated turbine controller 48 is shown including the third subcontroller means, such as the turbine power subcontroller 49, of VSG controller 40. The inputs to the turbine controller 48 are the active output power signal $P_{eo*}$ and the power demand signal $P_{eo,REF}$. The output signal of the turbine controller 48 is the turbine control signal $g*$ which represents the desired position of the turbine 26 adjustable setting.

The active power output signal $P_{eo*}$ is subtracted by subtracting means, such as summer 104, from the output power reference signal $P_{eo,REF}$ producing a power difference signal, designated as x in FIG. 1. The power difference signal x is received by oscillation limiter means, such as a deadband control block 106, for limiting undesirable oscillations of the turbine power subcontroller 49 within deadband limits by producing a deadband output signal indicated as letter y. The deadband output signal is received by the turbine power subcontroller 49. The turbine power subcontroller 49 mainly functions to set the gate position so the actual output power is equal to a certain desired value indicated by the reference value $P_{eo,REF}$. Such turbine power subcontrollers are commercially available, for example, electrohydraulic governors are commonly used.

The turbine controller 48 also includes an excitation limiter 108, which limits the output signal $g*$ to a maximum value of $g_{max}$, as mentioned above with respect to the rotor speed subcontroller 54. The excitation limiter 108 effectively limits the excitation requirement to moderate levels, allowing operation at maximum efficiency over a wide variation margin of resource or electric load conditions. The excitation limiter 108 receives an input from the turbine power subcontroller 49.

Figure 14:
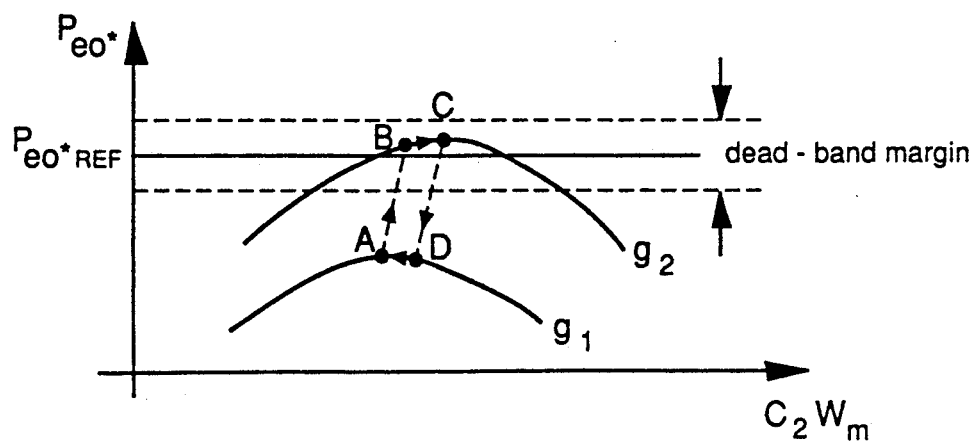
FIG. 14 is a graph illustrating the power speed characteristics of one form of the turbine of the present invention for steady resource conditions and differing turbine gate positions.

The deadband control block 106 implements a narrow deadband margin of the output signal y, which is an input to the turbine power subcontroller 49. The deadband control block 106 effectively avoids undesirable oscillation to the active power output $P_{eo}$ and rotor speed $\omega_m$ due to interaction of the rotor speed subcontroller 54 and the turbine power subcontroller 49. Without the deadband control block 106, an oscillation similar to the exaggerated example of FIG. 14 may occur, even if there is no change in the head conditions.

For example, suppose that the VSG system 20 is initially operated at maximum efficiency with gate position $g_1$. This corresponds to the operating point A. Now consider a request for a change in the reference signal to the value indicated by $P_{eo,REF}$ in FIG. 14. Since the value of the output power signal $P_{eo*}$ is less than the reference value $P_{eo,REF}$, the turbine power subcontroller 49 gradually increases the gate position, for example, to $g_2$. Hence, the operating point is moved to point B which does not yet quite correspond to the maximum efficiency operation. The rotor speed subcontroller 54 acts to move the operating point to point C, corresponding to the maximum efficiency operation at gate position $g_2$.

However, at operating point C the value of the output power signal $P_{eo*}$ is greater than the reference value $P_{eo,REF}$. This situation would cause the turbine power subcontroller 49 to decrease the gate position. This example assumes a theoretical possibility that the gate position is decreased to the original gate position $g_1$, resulting in operation at point D. To achieve maximum efficiency, the rotor speed subcontroller 54 will move the operating point back to point A to achieve maximum efficiency operation at gate position $g_1$.

The above example is a worst case situation resulting in a sustained oscillation phenomenon. The damping naturally present in such a system may decrease the amplitude of oscillation gradually. However, the deadband margin indicated in FIG. 14 would prevent this oscillation phenomenon. The effective deadband is a very small margin, considering the fact that the turbine efficiency maximizer 62 of the rotor speed subcontroller 54 is a continuously acting processor.

The rotor speed subcontroller 54 closely tracks the maximum efficiency operating condition while the gate position is gradually changed by the turbine power subcontroller 49. Thus, the deadband margin may be designed in relation to the output power improvement which results from reduction of the doubly fed machine losses. For example, a deadband margin on the order of 0.1 percent of the rated output power of the VSG system 20 is reasonable.

In summary, the present invention provides for an energy conversion system 18 comprising a variable speed generation system 20, input sensors 42, output sensors 44, 46 and a VSG controller 40 which receives signals from the sensors 42, 44, 46, and which sends control signals to the VSG system 20. The VSG system 20 includes a turbine 26 which drives a rotor having rotor windings 32 of a doubly fed machine 30 via shaft 28. A power electronic converter 34 applies excitation power to the rotor windings 32 according to a converter control signal received from the VSG controller 40. The power electronic converter 34 receives power from an excitation power source, illustrated as a tapped excitation source of FIG. 1 and an external excitation source shown in FIG. 2. The stator 36 of the doubly fed machine 30 supplies power to an electric power grid 24.

The VSG controller 40 comprises a turbine controller 48 and a converter controller 50. The converter controller 50 includes a voltage subcontroller 52 which provides a maximum excitation amplitude signal, and a rotor speed subcontroller 54 which supplies an excitation frequency signal. The converter controller 50 also includes a signal generator 56 which combines the maximum amplitude signal and the frequency signal into a converter control signal for input to the power electronic converter 34.

The turbine controller 48 includes a turbine power subcontroller 49, deadband oscillation controller on the input side of the generator and an excitation limiter 104 on the output side of subcontroller 49. An output power sensor signal is subtracted from a reference power signal which corresponds to a desired dispatch strategy, to provide a power difference signal for input to the deadband control block 106. A deadband output signal is produced by the deadband control block 106 for input to the turbine power subcontroller 49. Before producing a turbine control signal, the turbine power subcontroller 49 output is filtered by the excitation limiter 106, which limits the turbine control signal to values at which the doubly fed generator 30 is efficiently operated. The turbine control signal is sent to the turbine 26 to control the adjustable turbine setting, which in the hydro example controls the gate position.

The present invention also provides for a VSG controller and for a method of converting resource energy from a resource into electrical power utilizing a doubly fed generator, such as 30.

A method is also provided for converting the resource energy from resource 22 into electrical power for supply to the polyphase electric power grid 24, using the doubly fed generator 30 coupled to a turbine 26 having an adjustable turbine setting. This method comprises the following steps. In monitoring and sensing steps, the resource energy inputs to the turbine 26 and the terminal voltage and output power of the doubly fed generator 30 are monitored, and respective turbine input, generator terminal voltage and output power sensor signals are produced. In setting steps, a power demand signal and a generator voltage reference demand signal are set according to a desired dispatch strategy. In a turbine controller signal processing step, the generator output power sensor signal and the power demand signal are processed to produce a turbine control signal. In a converter controller signal processing step, a generator output sensor signal, the turbine input sensor signal, a generator voltage reference signal and the generator output terminal voltage signal are processed to produce a converter control signal. In a receiving and converting step, the turbine receives the resource energy and converts it into mechanical energy. In a driving step, the coupled doubly fed generator is driven at a rotor speed by the turbine. In a converting step, power is received from an excitation power source and converted into excitation power in response to the converter control signal. In an excitation step, the excitation power is applied to the rotor windings of the doubly fed generator to produce generator output power at the system frequency of the grid. This method is capable of producing electrical power for supply to the grid with maximum efficiency of the turbine 26 and the doubly fed generator 30, irrespective of variations in the resource energy, by controlling the excitation power and the rotor speed.

Having illustrated and described the principles of my invention with reference to one preferred embodiment, it should be apparent to those persons skilled in the art that such invention may be modified in arrangement and detail without departing from such principles. For example, although mainly a hydro generation system is illustrated, the turbine means used in the variable speed generation system 20 can take on a variety of different forms. For example, this energy conversion system is ideal for the alternate resources, such as wind, geothermal or solar. It could also be applied to the fossil fuels, such as coal and oil which are consumed in boilers to produce steam for driving steam turbines. Also, such a system could use a gas turbine, an internal combustion engine, or one of the various reciprocating engines as turbine means 26. We claim as our invention all such modifications as come within the true spirit and scope of the following claims.

We claim:

1. An energy conversion generation system for receiving resource energy from a resource and converting the resource energy into an electrical power output for supply to a polyphase electric power grid operating at a system frequency, the energy generation conversion system comprising:
    a variable speed generation system including turbine means for converting a resource energy input from the resource into mechanical energy at a rotor speed;
    energy converter means for producing excitation power;
    a doubly fed generator coupled to the turbine means and having a rotor with excitation rotor windings and with means for applying the excitation power from the energy converter means to the rotor windings, the rotor being driven by the mechanical energy from the turbine means, and a stator with stator windings to supply the electrical power output to the power grid; and
    control means for varying the rotor speed in response to the power output and resource energy input to increase the ratio of the electrical output power to the resource energy input received from the resource.

2. A system according to claim 1 in which the control means also includes means for controlling the resource energy input from the resource.

3. An energy conversion generation system for receiving resource energy from a resource and converting the resource energy into an electrical power output for supply to a polyphase electric power grid operating at a system frequency, the energy conversion system comprising:
    a variable speed generation system including turbine means for converting a resource energy input from the resource into mechanical energy at a rotor speed;
    energy converter means for producing excitation power;
    a doubly fed generator coupled to the turbine means and having a rotor with excitation rotor windings and with means for applying the excitation power from the energy converter means to the rotor windings, the rotor being driven by the mechanical energy from the turbine means, and a stator with stator windings to supply the electrical power output to the power grid;
    input sensor means for sensing at least one parameter of the resource energy received by the turbine means, and for producing a turbine input sensor signal;
    generator output sensor means for sensing the output power from the doubly fed generator which is supplied to the power grid, and for producing a generator output sensor signal;
    converter signal processing means for receiving and processing the generator output sensor signal and the turbine input sensor signal, the converter signal processing means comprising means for producing a converter control signal in response to the generator output sensor signal and the turbine input sensor signal; and
    the energy converter means comprising means for controlling the excitation power in response to the converter control signal to vary the rotor speed to reduce power losses in the generator.

4. An energy conversion generation system for receiving resource energy from a resource and converting the resource energy into an electrical power output for supply to a polyphase electric power grid operating at a system frequency, the energy conversion system comprising:
    a variable speed generation system including turbine means for converting a resource energy input from the resource into mechanical energy at a rotor speed, the variable speed generation system further including energy converter means for producing excitation power, and a doubly fed generator coupled to the turbine means and having a rotor with excitation rotor windings and with means for applying the excitation power from the energy converter means to the rotor windings, the rotor being driven by the mechanical energy from the turbine means, and a stator with stator windings to supply the electrical power output to the power grid;
    turbine input sensor means for sensing at least one parameter of the resource energy input received by the turbine means, and for producing a turbine input sensor signal;
    generator output sensor means for sensing the output from the doubly fed generator supplied to the power grid, and for producing a generator output sensor signal;
    a variable speed generation controller including turbine signal processing means for receiving and processing the generator output sensor signal to produce a turbine control signal, and converter signal processing means for receiving and processing the generator output sensor signal, the turbine input sensor signal, and the turbine control signal to produce the converter control signal;
    resource energy adjustment means coupled to the variable speed generation controller for receiving the turbine control signal and for controlling the energy delivered to the turbine means, and thereby the resource energy converted into rotational mechanical energy, in response to the turbine control signal;
    the energy converter means comprising means for controlling the excitation power in response to the converter control signal; and
    the variable speed generation controller comprising means for controlling the excitation power and the resource input energy delivered to the turbine means to control the efficiency of the variable speed generation system, irrespective of variations in the resource energy.

5. An energy conversion generation system according to claim 4 further including means for producing a power demand signal, the turbine signal processing means also receiving and processing the power demand signal to produce the turbine control signal, the system also including means for producing a generator reference demand signal, the converter signal processing means also receiving and processing the generator reference demand signal to produce the converter control signal.

6. An energy conversion generation system according to claim 5 wherein the generator output sensor means comprises generator terminal voltage sensor means for sensing the generator terminal voltage and for producing a terminal voltage sensor signal, and generator output power sensor means for sensing generator power output and for producing a power output sensor signal.

7. An energy conversion generation system according to claim 6 including means for producing a generator voltage reference demand signal and wherein the converter signal processing means includes voltage subcontroller means for subtracting the terminal voltage sensor signal from the generator voltage reference demand signal to produce a difference signal, the converter signal processing means also including means responsive to the difference signal for producing a maximum rotor excitation signal, the converter signal processing means also including rotor speed subcontroller means for receiving and processing the generator output power sensor signal, the turbine input sensor signal and the turbine control signal, and for producing an excitation frequency signal, and the converter signal processing means further including signal generator means for receiving and processing the maximum rotor excitation signal and the excitation frequency signal, and for producing the converter control signal.

8. An energy conversion generation system according to claim 7 wherein the maximum rotor excitation signal represents a maximum rotor winding current amplitude component of the excitation power applied to the rotor windings.

9. An energy conversion generation system according to claim 4 wherein the energy converter means comprises means operable in a controllable current source mode, and the converter control signal represents a rotor winding excitation current signal.

10. An energy conversion generation system according to claim 4 wherein the resource is hydro having a pressure head and a flow rate, and the turbine input sensor means including pressure head sensor means for sensing the parameter of the hydro pressure head and for producing a first turbine input signal comprising a head signal, the turbine input sensor means also including change in flow rate sensor means for sensing the parameter of a change in the flow rate with respect to a previous flow rate and for producing a second turbine input signal comprising a change in flow rate signal, the generator output sensor means comprises power sensor means for sensing generator power output and for producing a power output sensor signal, and the converter signal processing means including hydro turbine rotor speed controller means for receiving and processing the power output sensor signal, the turbine control signal, the head signal and the change in flow rate signal and for producing an excitation frequency signal in response to the received signals, the converter signal processing means also comprising means for producing the converter control signal in response to the excitation frequency signal.

11. An energy conversion generation system according to claim 10 wherein the resource energy adjustment means comprises gate means for varying the hydro flow through the turbine means, and wherein the turbine control signal comprises a gate position control signal, the gate means being responsive to the gate position control signal to vary the hydro flow through the turbine means.

12. An energy conversion generation system according to claim 4 wherein the resource is wind, and wherein the turbine means comprises wind turbine means having blade means for converting the wind into mechanical energy, and wherein the resource energy adjustment means comprises turbine blades with an adjustable pitch angle, and wherein the turbine control signal comprises a blade pitch adjustment signal, the blade means being responsive to the blade pitch adjustment signal to vary the blade pitch and thereby the amount of energy input to the turbine means from the resource.

13. An energy conversion generation system according to claim 4 further including tapping means for tapping a portion of the electrical power output from the stator windings and supplying the tapped portion of the electrical power output to the energy converter means, thereby establishing a tapped excitation system wherein the doubly fed generator output power comprises an excitation power source for the energy converter means.

14. An energy conversion generation system according to claim 4 further including means for supplying the energy converter means with power from one of the group of external excitation power sources comprising the power grid, a battery source, and a separate generator.

15. A method for converting resource energy from a resource into electrical power for supply to a polyphase electric power grid operating at a system frequency, using a doubly fed generator coupled to a turbine having an adjustable turbine setting, the method comprising the steps of:
monitoring the resource energy received by the turbine and producing a turbine input sensor signal;
sensing the doubly fed generator output power supplied to the power grid and producing a generator output power sensor signal;
sensing the generator output terminal voltage and producing a generator output terminal voltage signal;
setting a power demand signal;
setting a generator voltage reference demand signal;
processing the generator output power sensor signal and the power demand signal to produce a turbine control signal;
processing the generator output power sensor signal, the turbine input sensor signal, the turbine control signal, a generator voltage reference demand signal, and the generator output terminal voltage signal to produce a converter control signal;
receiving and converting the resource energy into mechanical energy with the turbine;
driving the coupled doubly fed generator at a rotor speed with the mechanical energy supplied by the turbine;

adjusting the resource energy received by the turbine to control the rotor speed;

converting power received from an excitation power source into excitation power for the doubly fed generator in response to the converter control signal, and exciting rotor windings of the doubly fed generator with the excitation power to produce generator output power at the system frequency for supply to the electric power grid.

16. A method for converting resource energy according to claim 15 wherein the sensing step further comprises sensing the generator terminal voltage and producing a terminal voltage sensor signal.

17. A method for converting resource energy according to claim 15 wherein the processing step which produces the converter control signal comprises the steps of:

subtracting a generator output terminal voltage signal from the generator voltage reference demand signal to produce a voltage difference signal; and regulating the generator voltage in response to the voltage difference signal to produce a maximum excitation signal corresponding to the maximum amplitude of the current component of the excitation power, the processing step which produces the converter control signal also comprising the steps of receiving and processing the generator output power sensor signal, the turbine input sensor signal and the turbine control signal to produce an excitation frequency signal, and the processing step which produces the converter control signal further comprising the signal generating step of receiving and processing the maximum excitation signal and the excitation frequency signal to produce the converter control signal.

18. A method for converting resource energy according to claim 15 wherein the receiving step comprises receiving hydro resource energy having a pressure head and a flow rate through the turbine; and wherein the monitoring step comprises the steps of (a) monitoring the pressure head and producing a first turbine input sensor signal comprising a head signal, and (b) monitoring a change in the flow rate through the turbine with respect to a previous flow rate and producing a second turbine input sensor signal comprising a change in flow rate signal.

19. A method for converting resource energy according to claim 15 further including the step of tapping a portion of the generator output power to serve as the excitation power source.

20. A variable speed generation controller for controlling a variable speed generation system having a turbine which receives resource energy from a resource, a doubly fed generator driven by the turbine at a rotor speed, and a converter responsive to a converter control signal for exciting the doubly fed generator with excitation power, the generation system producing electrical power for supply to a polyphase electrical power grid operating at a system frequency, the system providing signals including a turbine input sensor signal and a generator output power sensor signal, the variable speed generation controller comprising:

rotor speed subcontroller means for receiving and processing the turbine input sensor signal and the generator output power sensor signal, the rotor speed subcontroller means comprising means for producing an excitation frequency signal from the received and processed signals; and signal generator means for receiving the excitation frequency signal, the signal generator means comprising means for varying the rotor speed in response to the power output and resource energy input to increase the ratio of the electrical power supplied to the grid to the resource energy received from the resource.

21. A variable speed generation controller for controlling a variable speed generation system having a turbine responsive to a turbine control signal which receives resource energy from a resource, a doubly fed generator driven by the turbine at a rotor speed, and a converter responsive to a converter control signal for exciting the doubly fed generator with excitation power converted from an excitation power source, the generation system producing electrical power having real and reactive components for supply to a polyphase electrical power grid operating at a system frequency, the system providing signals including a turbine input sensor signal, a generator terminal voltage sensor signal, an output power sensor signal, a power demand signal and a generator voltage reference demand signal, the variable speed generation controller comprising:

first voltage subcontroller means for receiving and processing the generator terminal voltage sensor signal and the generator voltage reference demand signal, the first voltage subcontroller means comprising means for controlling the reactive component of the electrical power by producing a maximum excitation amplitude signal from the received and processed signals;

second turbine power subcontroller means for receiving and processing the output power sensor signal and the power demand signal, the second turbine power subcontroller means comprising means for controlling the real component of the electrical power by producing a turbine control signal from the received and processed signals, the resource energy received by the turbine being controlled in response to the turbine control signal;

third rotor speed subcontroller means for receiving and processing the turbine input sensor signal, the output power sensor signal and the turbine control signal, the third rotor speed subcontroller means comprises means for producing an excitation frequency signal from the received and processed signals; and signal generator means for receiving the maximum excitation amplitude signal and the excitation frequency signal, the signal generator means comprising means for controlling the converter and the generator excitation by producing the converter control signal from the received and combined signals.

22. A variable speed generation system controller according to claim 21 wherein the rotor speed subcontroller means has a response speed which is faster than the response speed of the first and second subcontroller means and faster than changes in conditions of the resource energy.

23. A variable speed generation controller according to claim 21 wherein the rotor speed subcontroller means includes:

turbine efficiency maximizer means for receiving and processing the turbine control signal and the turbine input sensor signal, the turbine efficiency maximizer means comprising means for producing a turbine maximum efficiency excitation frequency signal;

variable speed generation system efficiency maximizer means for receiving and processing the output power sensor signal, the variable speed generation system efficiency maximizer means comprising means for producing a step change in the excitation frequency signal; and summer means for receiving and combining the turbine maximum efficiency excitation frequency signal and the step change in the excitation frequency signal, the summer means comprising means for producing a summer output excitation frequency signal corresponding to the excitation frequency signal.

24. A variable speed generation controller according to claim 23, wherein the rotor speed subcontroller means further includes oversynchronous excitation protector means for receiving and limiting the summer output excitation frequency signal and for producing the excitation frequency signal.

25. A variable speed generation controller according to claim 23, wherein the turbine efficiency maximizer means includes turbine characteristics storage means for storing the input/output characteristics of the turbine;

matching means for matching the turbine control signal with the input/output turbine characteristics to produce a turbine characteristics output signal; and means for receiving and processing the turbine characteristics output signal and the turbine input sensor signal, and for producing the turbine maximum efficiency excitation frequency signal.

26. A variable speed generation controller according to claim 25, wherein the variable speed generation system efficiency maximizer means further includes:

monitoring means for monitoring or checking for changes in the turbine maximum efficiency excitation frequency signal, the power demand signal, the generator voltage reference demand signal, and the reactive component of the electrical power, the monitoring means comprising means for selectively activating the variable speed generation system efficiency maximizer if such changes are discovered.

27. A variable speed generation controller according to claim 26, wherein the variable speed generation system efficiency maximizer means further includes:

new initial value establishing means for establishing an initial step change in the excitation frequency signal at a negative initial frequency step change value, the initial value establishing means further comprising means for measuring an initial value of the output power sensor signal, and means for setting an initial iteration step equal to an initial iteration step value;

measuring means for measuring a new value of the output power sensor signal;

comparator means for comparing the new value of the output power sensor signal with the initial value of the output power sensor signal, the comparator means comprising means for stopping the variable speed generation system efficiency maximizer if the new value is less than or equal to the initial value, the comparator means further comprising means for producing a comparator output signal if the new value is greater than the initial value of the output power sensor signal;

output means for receiving the comparator output signal, the output means comprising means for multiplying the iteration step value by the negative initial frequency step change value to produce an iterated frequency step change signal;

frequency summer means for receiving and summing the initial step change in the excitation frequency signal with the iterated frequency step change signal to produce the step change in the excitation frequency signal; and speed settling delay means for establishing a delay between successive steps.

28. A variable speed generation controller according to claim 21, wherein the turbine power subcontroller means includes:

subtracting means for subtracting the generator output power sensor signal from the power demand signal to produce a power difference signal;

oscillation limiter means for receiving the power difference signal, the deadband limiting means comprising means for limiting undesirable oscillations of the turbine power subcontroller means, the oscillation limiter comprising means for limiting the power difference signal to a value within deadband limits by producing a deadband output signal which is received by the turbine power subcontroller means.

29. An energy conversion generation system for receiving resource energy from a resource and converting the resource energy into an electrical power output for supply to a polyphase electrical power grid operating at a system frequency, the energy conversion generation system comprising:

a variable speed generation system including a turbine of a type which converts a resource energy input from the resource into mechanical energy at a rotor speed;

an energy converter of a type which produces excitation power;

a doubly-fed generator coupled to the turbine and having a rotor with excitation rotor windings which receive the excitation power from the energy converter, the rotor being driven by the mechanical energy from the turbine, with the doubly-fed generator also having a stator with stator windings to supply the electrical power output to the power grid; and a controller for varying the rotor speed in response to the power output and resource energy input to increase the ratio of the electrical output power to the resource energy input received from the resource.

30. A variable speed generation controller for controlling a variable speed generation system having a turbine which receives resource energy from a resource, a doubly-fed generator driven by the turbine at a rotor speed, and a converter responsive to a converter control signal for exciting the doubly-fed generator with the excitation power, the generation system producing electrical power for supply to a polyphase electric power grid operating at a system frequency, the system providing signals including a turbine input sensor signal and a generator output power sensor signal, the variable speed generation controller comprising:

a rotor speed subcontroller of a type which receives and processes the turbine input sensor signal and the generator output power sensor signal, with the rotor speed subcontroller producing an excitation frequency signal in response to the turbine input sensor signal and the generator output power sensor signal; and a signal generator which receives the excitation frequency signal and produces the converter control signal in response to the excitation frequency signal so as to vary the rotor speed in response to the electrical power produced by the generation system and the resource energy received by the turbine so as to increase the ratio of the electrical power supplied to the grid to the resource energy received from the resource.

* * * * *

UNITED STATES PATENT AND TRADEMARK OFFICE
CERTIFICATE OF CORRECTION

PATENT NO. : 4,994,684            Page 1 of 2

DATED      : February 19, 1991

INVENTOR(S) : HIAN K. LAUW AND GERALD C. ALEXANDER

It is certified that error appears in the above-identified patent and that said Letters Patent is hereby corrected as shown below:

On the Title page, item [56], U.S. Patent Documents, add the following:

```
--4,249,120    2/81   Earle . . . . . . . . . . 318/729
  4,476,424   10/84   Kalman . . . . . . . . . 318/832
  3,781,616   12/73   Mokrytzki et al.. . . . . 318/230
  4,455,522    6/84   Lipo . . . . . . . . . . 318/809
  4,344,025    8/82   Okuyama et al.. . . . . . 318/729
  4,426,611    1/84   Espelage et al. . . . . . 318/803
  4,392,099    7/83   Kuniyoshi . . . . . . . . 318/797
  3,617,838   11/71   Brandt . . . . . . . . . 318/225R--
```

Page 1, References Cited, Other Publications, "Bonneville Power Administration Contract No. 79-85BP2432 Mod-1, Jan. 1987." should be --Bonneville Power Administration Contract No. 79-85BP24332 Mod-1, Jan. 1987.--.

Column 12, line 46, "$P_{eo}^{*}$" should be --$P_{eo}^{*}$.--.

Column 16, line 34, "$V^{S}_{REF} = f(P^{VAR}_{DEMAND})$" should be --$V_{REF}^{S} = f(P^{VAR}_{DEMAND})$--.

Column 21, line 50, "$\omega f^{r}$" should be --$\Delta f^{r}$--.

Column 22, line 58, after "$P_{e}^{s,VAR}$" insert a comma --,--.

Column 34, line 59, delete "rotational".

Column 37, line 6, the comma "," should be a semi-colon --;--.

Column 39, line 50, delete "new."

UNITED STATES PATENT AND TRADEMARK OFFICE
CERTIFICATE OF CORRECTION

PATENT NO. : 4,994,684
DATED : February 19, 1991
INVENTOR(S) : HIAN K. LAUW AND GERALD C. ALEXANDER It is certified that error appears in the above-indentified patent and that said Letters Patent is hereby corrected as shown below:

Column 40, line 31, "electrical" should be --electric--.

Signed and Sealed this

Second Day of November, 1993

*Attest:*

BRUCE LEHMAN

*Attesting Officer*     Commissioner of Patents and Trademarks